US011601976B2

(12) United States Patent
Xue et al.

(10) Patent No.: US 11,601,976 B2
(45) Date of Patent: Mar. 7, 2023

(54) METHODS, APPARATUSES AND SYSTEMS FOR ENHANCED CHANNEL OCCUPANCY TIME (COT) SHARING IN WIRELESS COMMUNICATIONS

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Aleksandar Damnjanovic, Del Mar, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 17/124,964

(22) Filed: Dec. 17, 2020

(65) Prior Publication Data
US 2021/0195641 A1   Jun. 24, 2021

Related U.S. Application Data

(60) Provisional application No. 62/950,501, filed on Dec. 19, 2019.

(51) Int. Cl.
| *H04W 74/08* | (2009.01) |
| *H04W 74/00* | (2009.01) |
| *H04W 80/02* | (2009.01) |
| *H04W 72/044* | (2023.01) |
| *H04W 72/04* | (2023.01) |
| *H04B 1/713* | (2011.01) |

(52) U.S. Cl.
CPC ........ *H04W 74/0816* (2013.01); *H04B 1/713* (2013.01); *H04W 72/042* (2013.01); *H04W 72/046* (2013.01); *H04W 72/0413* (2013.01); *H04W 74/008* (2013.01); *H04W 80/02* (2013.01)

(58) Field of Classification Search
CPC ......... H04W 74/0816; H04W 72/0413; H04W 72/042; H04W 72/046; H04W 74/008; H04W 80/02; H04W 74/0808; H04B 1/713
See application file for complete search history.

(56) References Cited

U.S. PATENT DOCUMENTS

| 2017/0374680 A1* | 12/2017 | Chen ...................... H04W 28/24 |
| 2018/0027582 A1* | 1/2018 | Yerramalli ............ H04L 1/1861 370/336 |
| 2018/0270860 A1* | 9/2018 | Bhorkar ............ H04W 74/0808 |

(Continued)

*Primary Examiner* — Michael K Phillips
(74) *Attorney, Agent, or Firm* — Qualcomm Incorporated

(57) ABSTRACT

Methods, systems, and devices for wireless communication are described. A wireless device (base station or UE) may receive an indication of a listen before talk (LBT) gap for sharing a channel occupancy time (COT), the COT being acquired by another wireless device (base station or UE), and detect whether a slot within the COT is occupied by the other wireless device, the slot occurring prior to the LBT gap. The wireless device may also, responsive to detecting that the slot is occupied by the other wireless device, perform an LBT procedure during the LBT gap, and, responsive to a successful LBT procedure, transmit a signal to the other wireless device within the COT.

26 Claims, 13 Drawing Sheets

(56) References Cited

U.S. PATENT DOCUMENTS

| | | | |
|---|---|---|---|
| 2020/0037359 A1* | 1/2020 | Wang | H04L 1/1887 |
| 2020/0275430 A1* | 8/2020 | Salem | H04L 5/0055 |
| 2021/0153245 A1* | 5/2021 | Tooher | H04W 72/046 |
| 2022/0078841 A1* | 3/2022 | Tiirola | H04W 74/0808 |
| 2022/0256605 A1* | 8/2022 | Jiang | H04W 24/08 |
| 2022/0279592 A1* | 9/2022 | Wu | H04W 74/004 |

* cited by examiner

METHODS, APPARATUSES AND SYSTEMS FOR ENHANCED CHANNEL OCCUPANCY TIME (COT) SHARING IN WIRELESS COMMUNICATIONS

CLAIM OF PRIORITY

The present application for patent claims priority to U.S. Provisional Application No. 62/950,501 by Yisheng Xue et al., entitled "METHODS, APPARATUSES AND SYSTEMS FOR ENHANCED CHANNEL OCCUPANCY TIME (COT) SHARING IN WIRELESS COMMUNICATIONS," filed Dec. 19, 2019, which is hereby incorporated by reference in its entirety as if fully set forth below and for all applicable purposes.

BACKGROUND

The following relates generally to wireless communication, and more specifically to methods, apparatuses, and systems for enhanced channel occupancy time (COT) sharing in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In NR, it has been contemplated that the system will support some modes of communications over a shared spectrum or unlicensed radio frequency spectrum of a cellular network. In this regard, techniques for reserving the medium, such as listen-before-talk (LBT), for a duration of time (e.g., transmission opportunity (TXOP) or channel occupancy time (COT)) have been developed to ensure fairness and coexistence among devices operating in the shared spectrum. In some deployments, COT sharing is a technique that has been proposed in which a node can perform LBT to acquire a COT and share the COT with other devices. However, current COT sharing rules have been developed under the assumption that the sharing nodes are relatively close to each other. For large cells, there may be nodes located at the edge who may be out of the area covered by the LBT range. Accordingly, the current COT sharing rules may not be sufficient to protect to other nodes from interference when operating in the shared spectrum. Therefore, improved techniques for enhanced COT sharing in wireless communications may be desirable.

SUMMARY

The described techniques relate to improved methods, systems, devices, and apparatuses that support enhanced COT sharing in wireless communications. In an aspect, a method of wireless communications includes receiving, by a first wireless device, an indication of a listen before talk (LBT) gap for sharing a channel occupancy time (COT), the COT being acquired by a second wireless device, and detecting whether a slot within the COT is occupied by the second wireless device, the slot occurring prior to the LBT gap. The method further includes, responsive to detecting that the slot is occupied by the second wireless device, performing an LBT procedure during the LBT gap, and, responsive to a successful LBT procedure, transmitting a signal to the second wireless device within the COT.

In some aspects, a method of wireless communications includes receiving, by a first wireless device, an indication of a listen before talk (LBT) gap for sharing a channel occupancy time (COT), the COT being acquired by a second wireless device, and determining, by the first wireless device, whether to perform a first LBT procedure or a second LBT procedure during the LBT gap, the first LBT procedure being different from the second LBT procedure. The method further includes performing, by the first wireless device, the first LBT procedure or the second LBT procedure based the determination, and, responsive to a successful first LBT procedure or a successful second LBT procedure, transmitting, by the first wireless device, a signal to the second wireless device within the COT.

In other aspects, a device for wireless communications includes a processor, memory in electronic communication with the processor, and instructions stored in the memory. The instructions are executable by the processor to receive, by a first wireless device, an indication of a listen before talk (LBT) gap for sharing a channel occupancy time (COT), the COT being acquired by a second wireless device, and to detect whether a slot within the COT is occupied by the second wireless device, the slot occurring prior to the LBT gap. The instructions are further executable by the processor to, responsive to detecting that the slot is occupied by the second wireless device, perform an LBT procedure during the LBT gap, and to, responsive to a successful LBT procedure, transmit a signal to the second wireless device within the COT.

In some aspects, a device for wireless communications includes a processor, memory in electronic communication with the processor, and instructions stored in the memory. The instructions are executable by the processor to receive, by a first wireless device, an indication of a listen before talk (LBT) gap for sharing a channel occupancy time (COT), the COT being acquired by a second wireless device, and to determine, by the first wireless device, whether to perform a first LBT procedure or a second LBT procedure during the LBT gap, the first LBT procedure being different from the second LBT procedure. The instructions are further executable by the processor to perform, by the first wireless device, the first LBT procedure or the second LBT procedure based the determination, and to, responsive to a successful first LBT procedure or a successful second LBT procedure, transmit, by the first wireless device, a signal to the second wireless device within the COT.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the disclosure are initially described in the context of a wireless communications system. Examples of techniques for long term channel sensing are described herein. Aspects of the disclosure are further illustrated by and described with reference to apparatus diagrams, system diagrams, flowcharts, and appendix that support various configurations of bandwidth parts in a shared spectrum.

Figure 1:
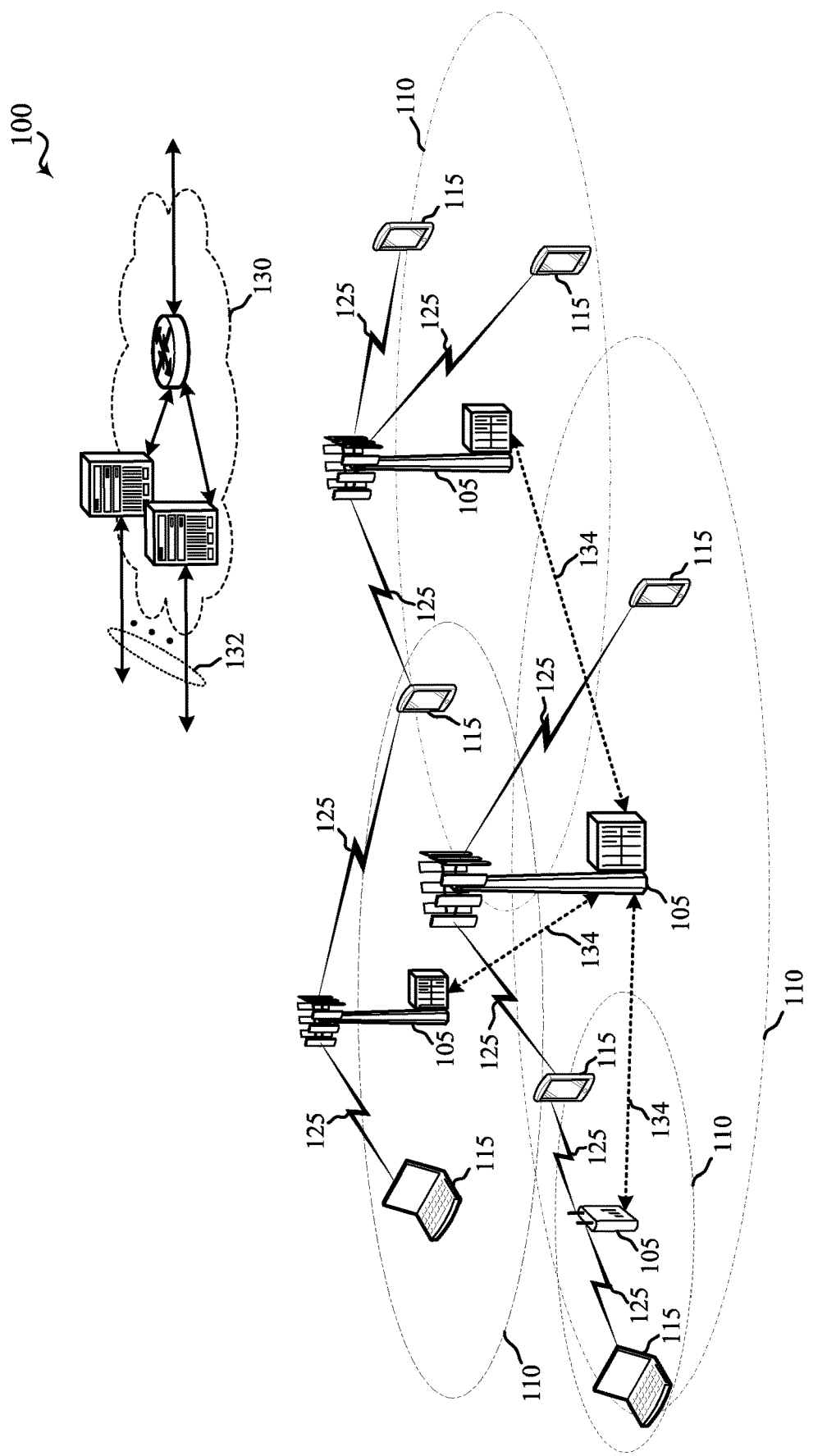
FIG. 1 illustrates an example of a system for wireless communication in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a New Radio (NR) network, a Long Term Evolution (LTE) network, or an LTE-Advanced (LTE-A) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed (NR-U), such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $Tf=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some frequency bands (e.g., 5 GHz band), current protocols have been established for nodes/devices operating in a shared spectrum. For example, a node can share its channel occupancy time (COT) with another node after performing a successful listen before talk (LBT) procedure. Such COT sharing has provided channel access flexibility and quality of service (QoS). However, the current protocols for COT sharing have been developed under the assumption that the sharing nodes are relatively close to each other so that they may clear the channel simultaneously. This assumption may not be correct as new radio access technologies, such as NR, may deploy large cells in which many UEs may be located at the edge of the cell. Accordingly, these cell-edge UEs may be out of the area covered by the base station's LBT range. Similarly, the base station may be out of the area covered by the cell-edge UE's LBT range.

Figure 2:
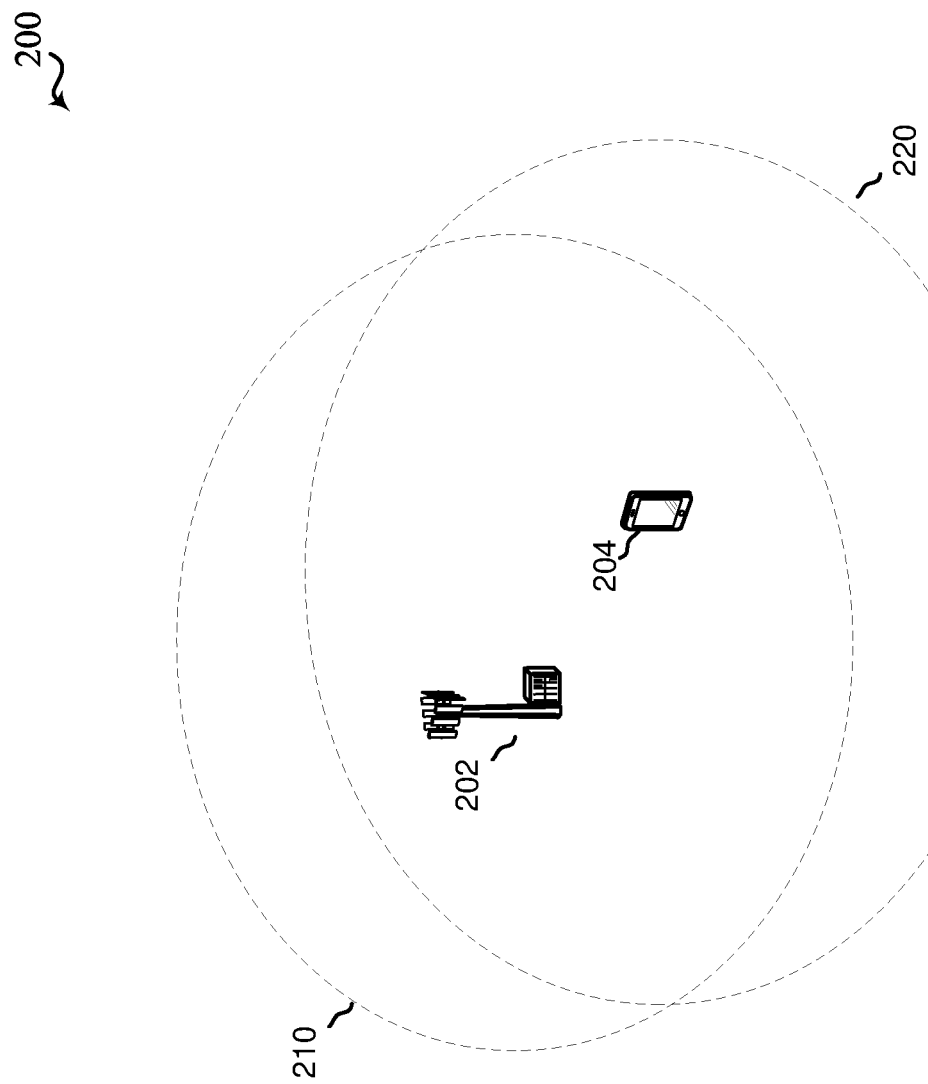
FIG. 2 illustrates an example of a system for supporting COT sharing in wireless communications in accordance with aspects of the present disclosure.

FIG. 2 illustrates a diagram of a system 200 for supporting COT sharing in wireless communications. In some examples, the system 200 may be deployed as an NR system operating in a shared spectrum, which may include shared frequency bands, such as, for example, unlicensed frequency bands. The NR system operating in the unlicensed spectrum may be referred to as an NR-U system. For example, the system 200 may include a base station 202 (e.g., base station 105 in FIG. 1) and UE 204 (e.g., UE 115 in FIG. 1) communicating in the shared spectrum. It is noted that the system 200 may be deployed with many more base stations and UEs communicating in multiple coverage areas, and that one base station and one UE are described in FIG. 2 for the sake of simplicity and ease of discussion.

In an aspect, a base station 202 may share its COT to schedule a UE 204 and facilitate a scheduled uplink transmission. This may be referred to as base station-to-UE COT sharing. In another aspect, a UE 204 performing a configured grant uplink (CG-UL) transmission may share the COT with a base station for low-latency feedback (e.g., HARQ feedback) and other purposes. This may be referred to as UE-to-base station COT sharing.

In one scenario, the base station 202 may acquire or reserve a COT by performing a category 4 (CAT4) LBT. If the CAT4 LBT is successful (i.e., channel is idle), the base station 202 may transmit an uplink (UL) grant via a PDCCH (e.g., downlink (DL) transmission) for scheduling the UE 204 within the COT. The UE 204 may determine a type or category LBT procedure to perform after the DL transmission. The UE 204 may make this determination based on a duration of a gap between the DL transmission and the scheduled UL transmission. In some examples, the UE 204 may perform a category 1 (CAT1 LBT) if the gap is less than 16 µs. In some other examples, the UE 204 may perform a category 2 (CAT2) LBT procedure if the gap is more than 16 µs but does not exceed 25 µs.

In another scenario, the UE 204 may acquire or reserve a COT by performing a CAT4 LBT. If the CAT4 LBT is successful (i.e., channel is idle), the UE 204 may perform an UL transmission (e.g., CG-UL) during a portion of the COT. The UE 204 may share a remaining portion of the COT with the base station 202 for transmitting low-latency feedback or other type of control information (e.g., DL transmission). Accordingly, the base station 202 may determine a type or category LBT procedure to perform after the UL transmission. The base station 202 may make this determination based on a duration of a gap between the UL transmission and the DL transmission. In some examples, the base station 202 may perform a CAT1 LBT if the gap is less than 16 μs. In some other examples, the base station 202 may perform a CAT2 LBT procedure if the gap is more than 16 μs but does not exceed 25 μs.

The COT sharing protocols described above have been established with an assumption that the base station 202 and UE 204 are relatively close to each other so that they may clear the channel simultaneously. As such, the UE 204 would be covered by the base station 202 LBT range 210, and the base station 202 would be covered by the UE 204 LBT range 220. Thus, COT sharing may provide a safe and flexible mechanism for channel access without undue interference to other devices operating in the shared spectrum.

Figure 3:
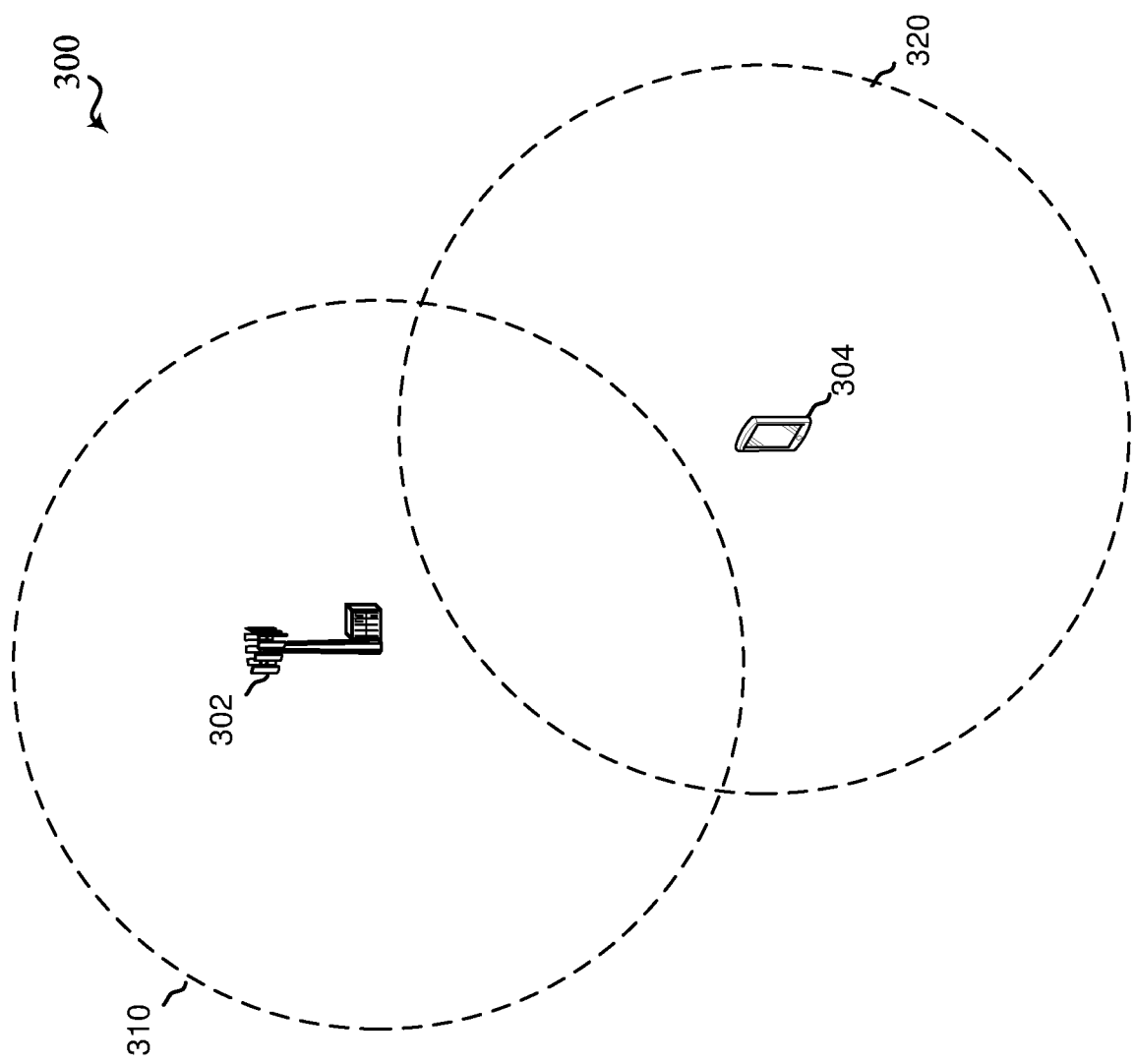
FIG. 3 illustrates an example of a system for supporting COT sharing in wireless communications in accordance with aspects of the present disclosure.

FIG. 3, illustrates a diagram of a system 300 for supporting COT sharing in wireless communications. In some examples, the system 300 may be deployed as an NR system operating in a shared spectrum, which may include shared frequency bands, such as, for example, unlicensed frequency bands. The NR system operating in the unlicensed spectrum may be referred to as an NR-U system. For example, the system 300 may include a base station 302 (e.g., base station 105 in FIG. 1) and UE 304 (e.g., UE 115 in FIG. 1) communicating in the shared spectrum. It is noted that the system 300 may be deployed with many more base stations and UEs communicating in multiple coverage areas, and that one base station and one UE are described in FIG. 3 for the sake of simplicity and ease of discussion.

In a scenario, the UE 304 may be located at an edge of a cell of the base station 302. In the NR system, it has been observed that the UE 304 may be out of the area covered by the base station's 302 LBT range 310. It is noted although the UE 304 is shown out of the LBT range, the UE 304 may still be located within the service coverage area (e.g., cell edge) of the base station 302. Likewise, the base station 302 may be out of the area covered by the UE's 304 LBT range 320. Accordingly, the COT sharing protocols described above in FIG. 2 may not be sufficient and may cause problems in some situations. For example, CAT1 or CAT2 LBT may have a weaker back-off capability with respect to receiver protection in comparison to CAT4 LBT. This may be especially impactful when the base station 302 or UE 304 transmits with a certain transmission power. Therefore, it may be desirable to develop new rules and/or protocols for COT sharing in some shared frequency bands (e.g., 6 GHz band) to achieve safe and flexible COT sharing in the presence of these cell-edge UEs (e.g., UE 304). Thus, techniques for enhanced COT sharing in the shared spectrum are described in detail below.

Figure 4:
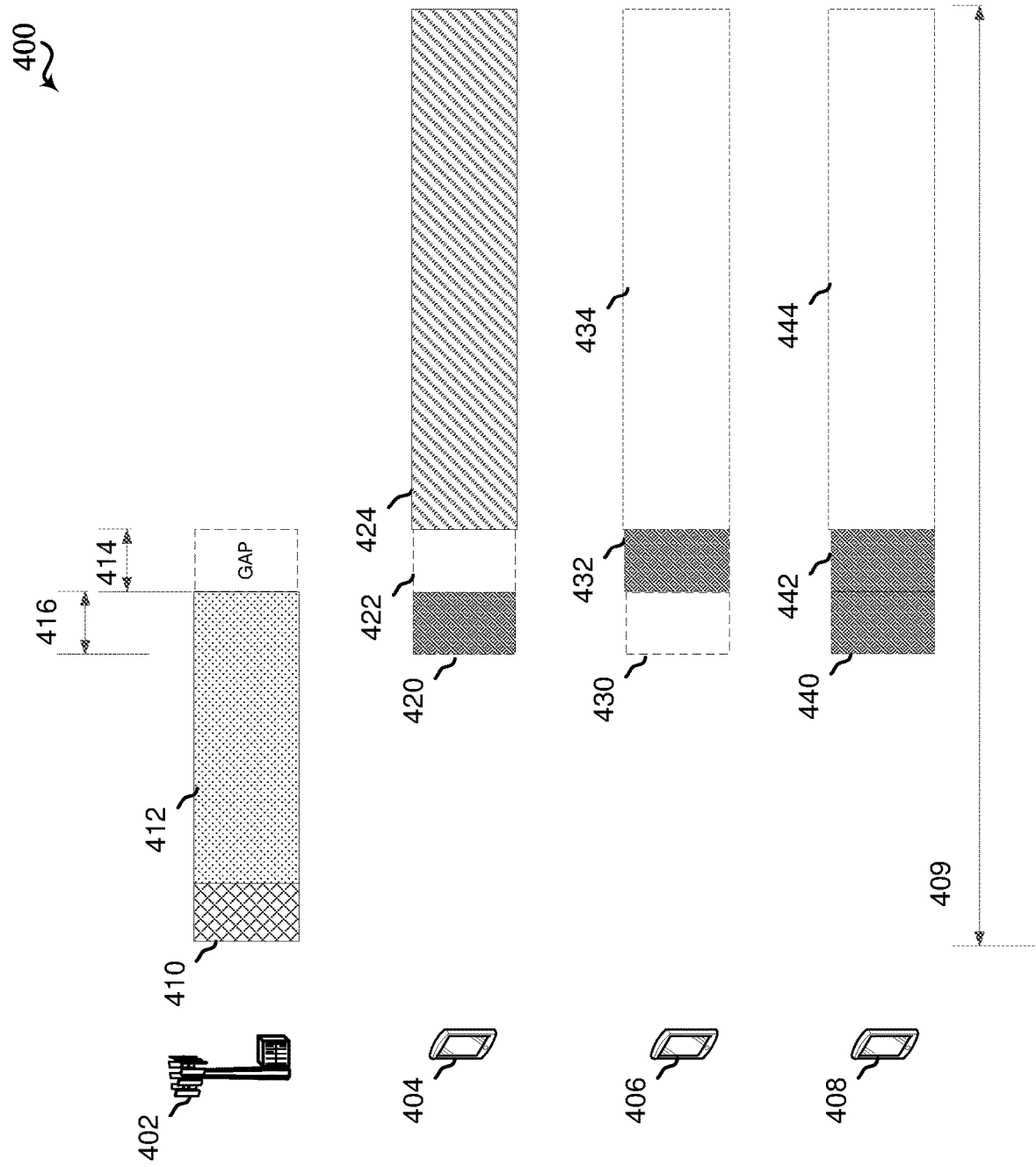
FIG. 4 illustrates a diagram of a system for supporting enhanced COT sharing in wireless communications in accordance with aspects of the present disclosure.

FIG. 4 illustrates a diagram of a system 400 for supporting enhanced COT sharing in a shared spectrum in accordance with aspects of the present disclosure. In some examples, the system 400 may be deployed as an NR system operating in a shared spectrum, which may include shared frequency bands, such as, for example, unlicensed frequency bands. The NR system operating in the unlicensed spectrum may be referred to as an NR-U system. For example, the system 300 may include a base station 402 (e.g., base station 105 in FIG. 1) and UEs 404, 406, 408 (e.g., UE 115 in FIG. 1) communicating in the shared spectrum. The UEs 404, 406, 408 may be located at various distances from the base station 402 within cell. It is noted that the system 400 may be deployed with many more base stations and UEs communicating in multiple coverage areas, and that one base station and three UEs are described in FIG. 4 for the sake of simplicity and ease of discussion.

In an aspect, the base station 402 may enable COT sharing with the UEs 404, 406, 408. In this regard, the base station 402 may acquire a COT 409 by performing a CAT4 LBT. If the CAT4 LBT is successful (i.e., channel is idle), the base station 402 may transmit control information via a PDCCH 410, and data via a PDSCH 412 within the COT 409. For example, the base station 402 may send an UL grant via the PDCCH 410 for scheduling the UEs 404, 406, 408 for an UL transmission within the COT 409. That is, the base station 402 may perform a DL transmission (e.g., PDCCH 410 and PDSCH 412) and share a remaining portion of the COT 409 with the UEs 404, 406, 408 for a scheduled UL transmission. In some examples, the control information may indicate the end of the PDSCH 412 transmission and a duration of the COT 409. Such control information may be included in a downlink control message (DCI) for a specific UE or a group common DCI message (e.g., GC-PDCCH) for a group of UEs.

The uplink grant may include information about a gap 414 and a type or category LBT (e.g., CAT1 or CAT2 LBT) to be performed within the gap 414. In an example, the base station 402 may configure a CAT1 LBT if the gap 414 is less than or equal to 16 μs, or a CAT2 LBT if the gap 414 is greater than 16 μs and less than or equal to 25 μs. Additionally, the uplink grant may include a channel occupancy slot 416 that occurs prior to the gap 414. In some examples, the channel occupancy slot 416 may be configured to be floating with respect to the gap 414. The channel occupancy slot 416 may be used by the UEs 404, 406, 408 to determine whether it is occupied or not by the base station 402. In this regard, the UEs 404, 406, 408 may perform an UL transmission in the COT 409 if they detect a transmission in the channel occupancy slot 416 (i.e., channel is busy) and perform a successful LBT in the gap 414 (i.e., channel is idle). In some examples, the channel occupancy slot 416 may have a similar duration as the gap 414.

In this example, the UE 404 may receive an uplink grant via the PDCCH 410, and may determine that an UL transmission has been scheduled within the COT 409. First, the UE 404 may determine if the channel is occupied in the channel occupancy slot 416. The UE 404 may detect the PDSCH 412 from the base station 402 in the channel occupancy slot 416, and the energy of the PDSCH 412 transmission is above a certain threshold. Accordingly, the UE 404 may determine that the channel is occupied 420 in the channel occupancy slot 416. Then, the UE 404 may perform an LBT procedure 422 in the gap 414 to determine if the channel is idle prior to performing the scheduled UL transmission. The UE 404 may determine a type or category LBT (e.g., CAT1 or CAT2 LBT) to perform based on a duration of the gap 414. The UE 404 may use an energy detection (ED) threshold for the LBT procedure 422. In some examples, the ED threshold for the LBT procedure 422 may be the same as the threshold used in the channel occupancy slot 416. In some other example, the ED threshold for the LBT procedure 422 may be different from the threshold used in the channel occupancy slot 416. Here, the UE 404 does not detect energy above the ED threshold, and determines that the LBT procedure 422 is successful (i.e., channel is idle). Thus, the UE 404 may perform an UL transmission 424 within the COT 409. For example, the UE 404 may transmit a physical uplink control channel (PUCCH) and/or a physical uplink shared channel (PUSCH).

The UE 406 may receive an uplink grant via the PDCCH 410, and may determine that an UL transmission has been scheduled within the COT 409. Similar to the UE 404 described above, the UE 406 may determine if the channel is occupied in the channel occupancy slot 416. Here, the UE 406 may detect energy below a certain threshold, and may determine that the channel is unoccupied 430 in the channel occupancy slot 416. In some examples, the 406 may be located at a distance from the base station 402 where the UE 406 does not detect the PDSCH 412, or where the UE 406 detects the PDSCH 412 but the energy of the transmission is not above the threshold. Then, the UE 406 may perform an LBT procedure 432 in the gap 414. The UE 406 may determine a type or category LBT (e.g., CAT1 or CAT2 LBT) to perform based on a duration of the gap 414. The UE 406 may use an energy detection (ED) threshold for the LBT procedure 432. Here, the UE 406 detects energy above the ED threshold in the gap 414, and thus the LBT procedure 432 is unsuccessful (i.e., channel is busy). The UE 406 may detect energy from transmission from another node (not shown) that may be located relatively close to the UE 406 but not UE 404. Accordingly, the UE 406 may not perform an UL transmission 434 within the COT 409. In some aspects, the UE 406 may skip the LBT procedure 432 since it has not detected that the channel is occupied 430 in the channel occupancy slot 416. That is, the UE 406 did not detect transmission from the base station 402 in the channel occupancy slot 416, and thus, may not participate in sharing the COT 409.

The UE 408 may receive an uplink grant via the PDCCH 410, and may determine that an UL transmission has been scheduled within the COT 409. Similar to the UEs 404 and 406 described above, the UE 408 may determine if the channel is occupied in the channel occupancy slot 416. Here, the UE 408 may detect the PDSCH 412 from the base station 402 in the channel occupancy slot 416, and the energy of the PDSCH 412 transmission is above a certain threshold. Accordingly, the UE 408 may determine that the channel is occupied 440 in the channel occupancy slot 416. Then, the UE 408 may perform an LBT procedure 442 in the gap 414. The UE 408 may determine a type or category LBT (e.g., CAT1 or CAT2 LBT) to perform based on a duration of the gap 414. The UE 408 detects energy above the ED threshold in the gap 414, and thus the LBT procedure 442 is unsuccessful (i.e., channel is busy). The UE 408 may detect energy from transmission from another node (not shown) that may be located relatively close to the UE 408 but not UE 404. Thus, the UE 408 may not perform an UL transmission 444 within the COT 409.

The COT sharing protocol implemented in the system 400 may require a wireless device (e.g., a shared node) to determine that the channel is occupied (e.g., by a sharing node) during the channel occupancy slot 416 and idle during the LBT gap 414 prior to transmitting. It may be observed that other nodes located around the wireless device may also detect that the channel is occupied during the channel occupancy slot 416, and thus will not jump in during the COT 409. Although energy detection is described for determining whether the channel is occupied in the channel occupancy slot 416, signal detection may be used during the channel occupancy slot 416. Accordingly, the wireless device (e.g., UEs 404, 406, 408) may detect a signal, such as a reference signal, a preamble, and the like, to determine that the channel is occupied by the sharing node (e.g., base station 402). Furthermore, the COT sharing protocol may be used by a UE to share its COT with a base station. The UE may perform a CG-UL transmission and share its COT with the base station for feedback.

It is noted that although the channel occupancy slot 416 was described above as being configured dynamically via the DCI, it may be configured in other ways as well. In an aspect, the channel occupancy slot may be configured via an RRC message. The channel occupancy slot may be statically configured to occur just before the LBT gap. In another aspect, a UE may share its COT (for UE-to-base station COT sharing) and may dynamically configure the channel occupancy slot via an uplink control information (UCI) message. Furthermore, the channel occupancy slot 416 may not be adjacent to the gap 414 as shown in FIG. 2. Accordingly, the channel occupancy slot may be configured to have an offset relative to the LBT gap, and the offset may be configured dynamically (e.g., DCI or UCI) or statically (e.g., RRC).

Although the scenario described in FIG. 4 depicts one UE (e.g., UE 404) performing the uplink transmission, there may be other scenarios where more than one UE may comply with the COT sharing protocol and may transmit at the same time within the shared COT. In this regard, the multiple UEs may transmit over different bandwidth parts or different spatial layers to avoid collision.

Figure 5:
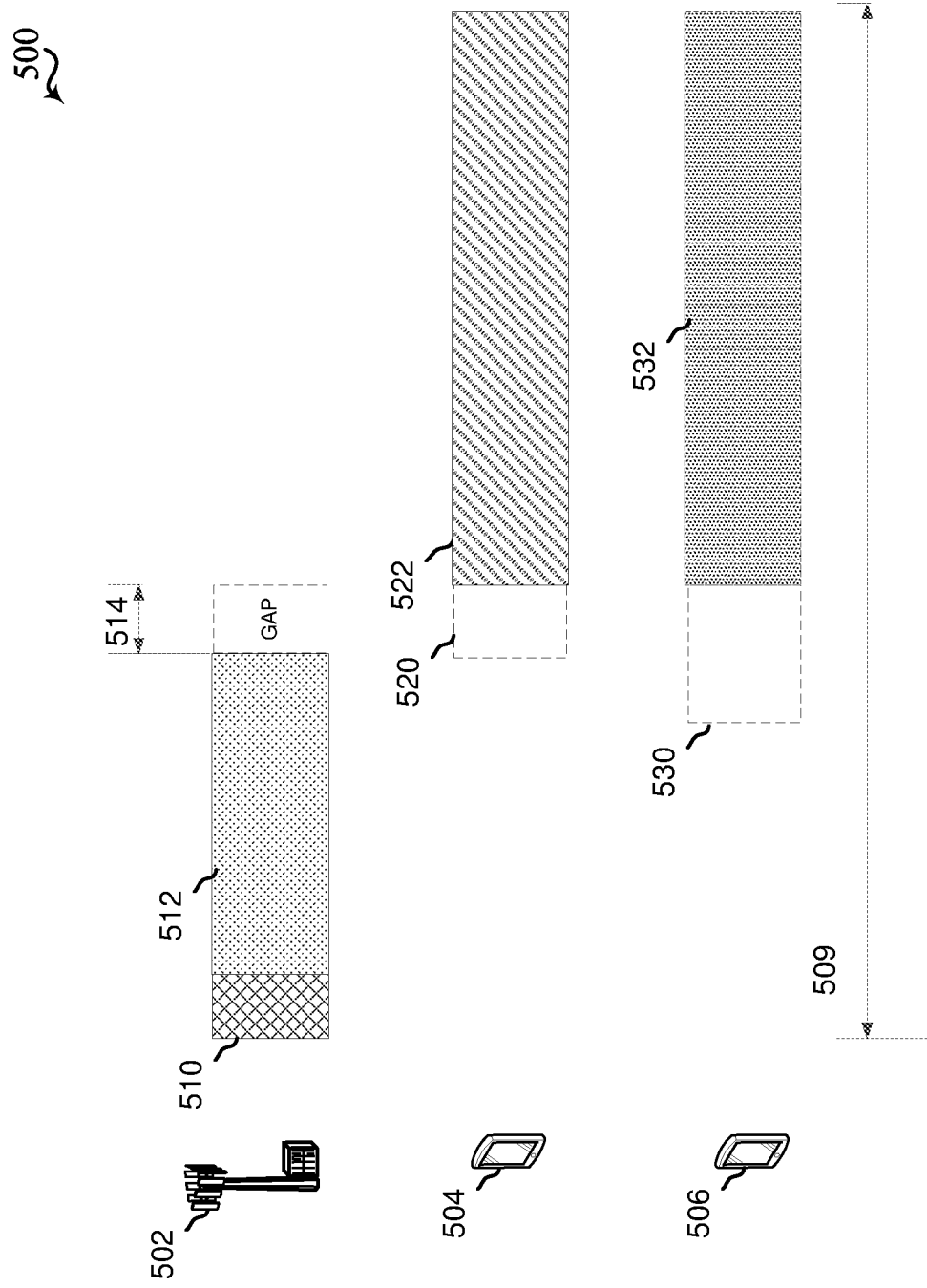
FIG. 5 illustrates a diagram of a system for supporting enhanced COT sharing in wireless communications in accordance with aspects of the present disclosure.

FIG. 5 illustrates a diagram of a system 500 for supporting enhanced COT sharing in a shared spectrum in accordance with aspects of the present disclosure. In some examples, the system 500 may be deployed as an NR system operating in a shared spectrum, which may include shared frequency bands, such as, for example, unlicensed frequency bands. The NR system operating in the unlicensed spectrum may be referred to as an NR-U system. For example, the system 500 may include a base station 502 (e.g., base station 105 in FIG. 1) and UEs 504, 506 (e.g., UE 115 in FIG. 1) communicating in the shared spectrum. It is noted that the system 500 may be deployed with many more base stations and UEs communicating in multiple coverage areas, and that one base station and two UEs are described in FIG. 5 for the sake of simplicity and ease of discussion.

In an aspect, the base station 502 may enable COT sharing with the UEs 504, 506. In this regard, the base station 502 may acquire a COT 509 by performing a CAT4 LBT. If the CAT4 LBT is successful (i.e., channel is idle), the base station 502 may transmit control information via a PDCCH 510, and data via a PDSCH 512 within the COT 509. For example, the base station 502 may send an UL grant via the PDCCH 510 for scheduling the UEs 504, 506 for an UL transmission within the COT 509. That is, the base station 502 may perform a DL transmission (e.g., PDCCH 510 and PDSCH 512) and share a remaining portion of the COT 509 with the UEs 504, 506 for a scheduled UL transmission. In some examples, the control information may indicate the end of the PDSCH 512 transmission and a duration of the COT 509. Such control information may be included in a DCI for a specific UE or a GC-PDCCH for a group of UEs. Additionally, the control information may include information about a gap 514 and a type or category LBT (e.g., CAT1 or CAT2 LBT) to be performed within the gap 514.

In this example, the UE 504 may receive an uplink grant via the PDCCH 510, and may determine that an UL transmission has been scheduled within the COT 509. The UE 504 may determine the category LBT to be performed in the gap 514 based on the uplink grant. The UE 504 may perform an LBT procedure 520 (e.g., CAT1 or CAT2) in the gap 514 to determine if the channel is idle prior to performing the scheduled UL transmission. The UE 504 may use an ED threshold for the LBT procedure 520. The UE 504 does not detect energy above the ED threshold, and determines that the LBT procedure 520 is successful (i.e., channel is idle). Thus, the UE 504 may perform an UL transmission 522 within the COT 509.

The UE 506 may receive an uplink grant via the PDCCH 510, and may determine that an UL transmission has been scheduled within the COT 509. The UE 506 may determine the category LBT to be performed in the gap 514. Here, the UE 506 may be requested to determine whether to use a CAT4 LBT to occupy a remaining portion of the COT 509 based on a measurement, such as a reference signal received power (RSRP) measurement. For example, the UE 506 may measure a DM-RS or other reference signal transmitted from the base station 502. The RSRP measurement may be indicative of a distance between the UE 506 and the base station 502. That is, the stronger/higher the RSRP measurement the closer the base station 502 may be from the UE 506. The UE 506 may determine that it may be at an edge of the cell of the base station 502 based on the RSRP measurement. As such, the UE 506 may perform a CAT4 LBT procedure 530 which may start prior to and ends at the gap 514 to determine if the channel is idle. The UE 506 does not detect energy above the ED threshold, and determines that the CAT4 LBT procedure 530 is successful (i.e., channel is idle). Thus, the UE 504 may perform an UL transmission 532 within the COT 509. In some other aspects, the UE 506 may use energy detection as the measurement to approximate the distance from the base station 502.

Although the COT sharing protocol is described in FIG. 5 with reference to base station-to-UE COT sharing, it may also be used by a UE to share its COT with a base station (UE-to-base station COT sharing). The UE may perform a CG-UL transmission and share its COT with the base station for feedback. In this regard, the base station may perform a CAT4 LBT for one attempt at a fixed starting point in the absence of any guidance of the COT sharing from the UE.

Figure 6:
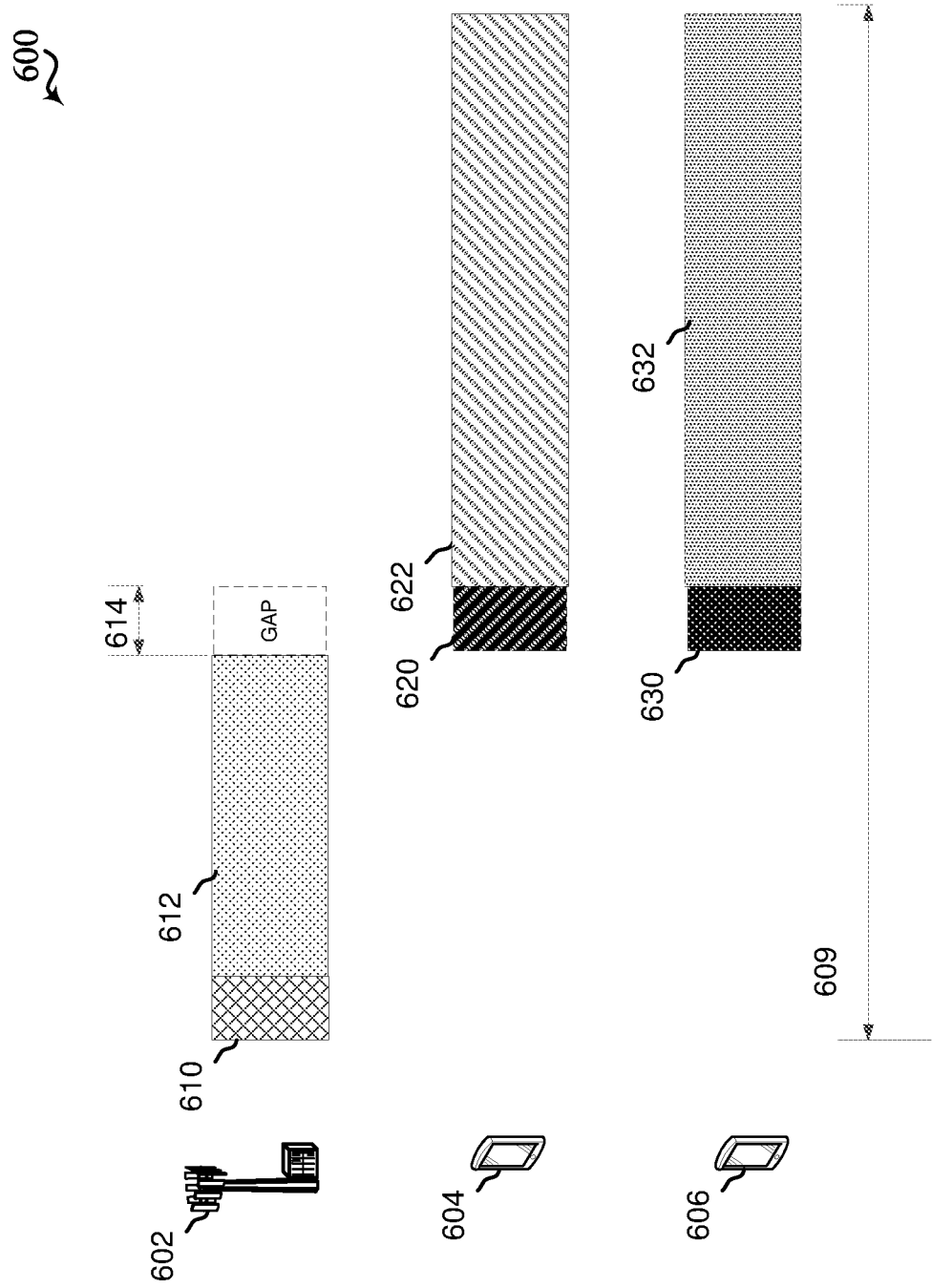
FIG. 6 illustrates a diagram of a system for supporting enhanced COT sharing in wireless communications in accordance with aspects of the present disclosure.

FIG. 6 illustrates a diagram of a system 600 for supporting enhanced COT sharing in a shared spectrum in accordance with aspects of the present disclosure. In some examples, the system 600 may be deployed as an NR system operating in a shared spectrum, which may include shared frequency bands, such as, for example, unlicensed frequency bands. The NR system operating in the unlicensed spectrum may be referred to as an NR-U system. For example, the system 600 may include a base station 602 (e.g., base station 105 in FIG. 1) and UEs 604, 606 (e.g., UE 115 in FIG. 1) communicating in the shared spectrum. It is noted that the system 600 may be deployed with many more base stations and UEs communicating in multiple coverage areas, and that one base station and two UEs are described in FIG. 6 for the sake of simplicity and ease of discussion.

In an aspect, the base station 602 may enable COT sharing with the UEs 604, 606. In this regard, the base station 602 may acquire a COT 609 by performing a CAT4 LBT. If the CAT4 LBT is successful (i.e., channel is idle), the base station 602 may transmit control information via a PDCCH 610, and data via a PDSCH 612 within the COT 609. For example, the base station 602 may send an UL grant via the PDCCH 610 for scheduling the UEs 604, 606 for an UL transmission within the COT 609. That is, the base station 602 may perform a DL transmission (e.g., PDCCH 610 and PDSCH 612) and share a remaining portion of the COT 609 with the UEs 604, 606 for a scheduled UL transmission. In some examples, the control information may indicate the end of the PDSCH 612 transmission and a duration of the COT 609. Such control information may be included in a DCI for a specific UE or a GC-PDCCH for a group of UEs. Additionally, the control information may include information about a gap 614 and a type or category LBT (e.g., CAT1 or CAT2 LBT) to be performed within the gap 614.

Further, the control information may include an ED threshold to use for the LBT procedure based on a distance from the base station 602. In this regard, the ED threshold may be dependent on the distance between a sharing node (e.g., base station 602) and a shared node (e.g., UE 604, 606). In some examples, the distance may be approximated based on a RSRP measurement. Accordingly, an ED threshold may be associated with a particular RSRP measurement or a range of RSRP measurement. In some other examples, the distance may be approximated based on an energy measurement. As such, an ED threshold may be associated with a particular energy level or a range of energy levels. The base station 604 may configure a lower ED threshold for UEs located at the cell-edge as compared to UEs located near the base station. Additionally, the base station 604 may specify (e.g., DCI message) which method to use to approximate the distance (e.g., RSRP measurement or energy measurement).

In this example, the UE 604 may receive an uplink grant via the PDCCH 610, and may determine that an UL transmission has been scheduled within the COT 609. The UE 604 may determine the category LBT to be performed in the gap 614 based a distance between the UE 604 and the base station 602, and may also determine a technique (e.g., RSRP measurement or energy measurement) to be used to approximate the distance. Accordingly, the UE 604 may perform the measurement, and select an ED threshold associated with the measurement. Here, the UE 604 may select the ED threshold (e.g., −72 dBm) based on an approximation that it is close to the base station 602 (i.e., RSRP measurement or energy measurement). The UE 604 may use the selected ED threshold and perform an LBT procedure 620 in the gap 614. The UE 604 does not detect energy above the ED threshold (e.g., −72 dBm), in this example, and determines that the LBT procedure 620 is successful (i.e., channel is idle). Thus, the UE 604 may perform an UL transmission 622 within the COT 609.

The UE 606 may receive an uplink grant via the PDCCH 610, and may determine that an UL transmission has been scheduled within the COT 609. The UE 606 may determine the category LBT to be performed in the gap 614 based a distance between the UE 606 and the base station 602, and may also determine a technique (e.g., RSRP measurement or energy measurement) to be used to approximate the distance. Accordingly, the UE 606 may perform the measurement, and select an ED threshold associated with the measurement. Here, the UE 606 may select the ED threshold (e.g., −82 dBm) based on an approximation that it is located at the cell-edge (i.e., RSRP measurement or energy measurement). In an aspect, the ED threshold decreases as the distance between the sharing node and shared node increases. The UE 606 may use the selected ED threshold and perform an LBT procedure 630 in the gap 614. The UE 606 does not detect energy above the ED threshold (e.g., −82 dBm), in this example, and determines that the LBT procedure 630 is successful (i.e., channel is idle). Thus, the UE 606 may perform an UL transmission 632 within the COT 609. It is noted that the UEs 604 and 606 are shown transmitting at the same time but may be transmitting over different bandwidth parts or different spatial layers to avoid collision.

Although the COT sharing protocol is described in FIG. 6 with reference to base station-to-UE COT sharing, it may also be used by a UE to share its COT with a base station (UE-to-base station COT sharing). The UE may perform a CG-UL transmission and share its COT with the base station for feedback. In some examples, the UE may configure where and how the base station is to measure RSRP or energy to approximate the distance and select the corresponding ED threshold. In some other examples, the base station may define the measurement technique and ED threshold whenever the UE decides to share its COT.

It is noted that the COT sharing protocols described in FIGS. 4, 5, and 6 may be combined to operate in parallel. For example, the distance-dependent ED threshold described in FIG. 6 may be used in the LBT procedures described in FIG. 4 or the LBT procedures described in FIG. 5. In another example, the COT sharing protocol described in FIG. 4 may implement the LBT procedure described in FIG. 5.

be configured as cell-specific parameters via a system information block (SIB), such as remaining minimum system information (RMSI), or a DCI message. Additionally, the COT sharing protocols may be configured as a node-specific (e.g., UE-specific or base station-) parameters via a dedicated radio resource control (RRC) message, a DCI message, a MAC-control element (MAC-CE), or uplink control information (UCI) message. The node may be configured as a sharing node, a shared node, or a shared node with respect to a sharing node. Furthermore, the COT sharing protocols may be configured as COT-specific via a DCI message or UCI message.

Figure 7:
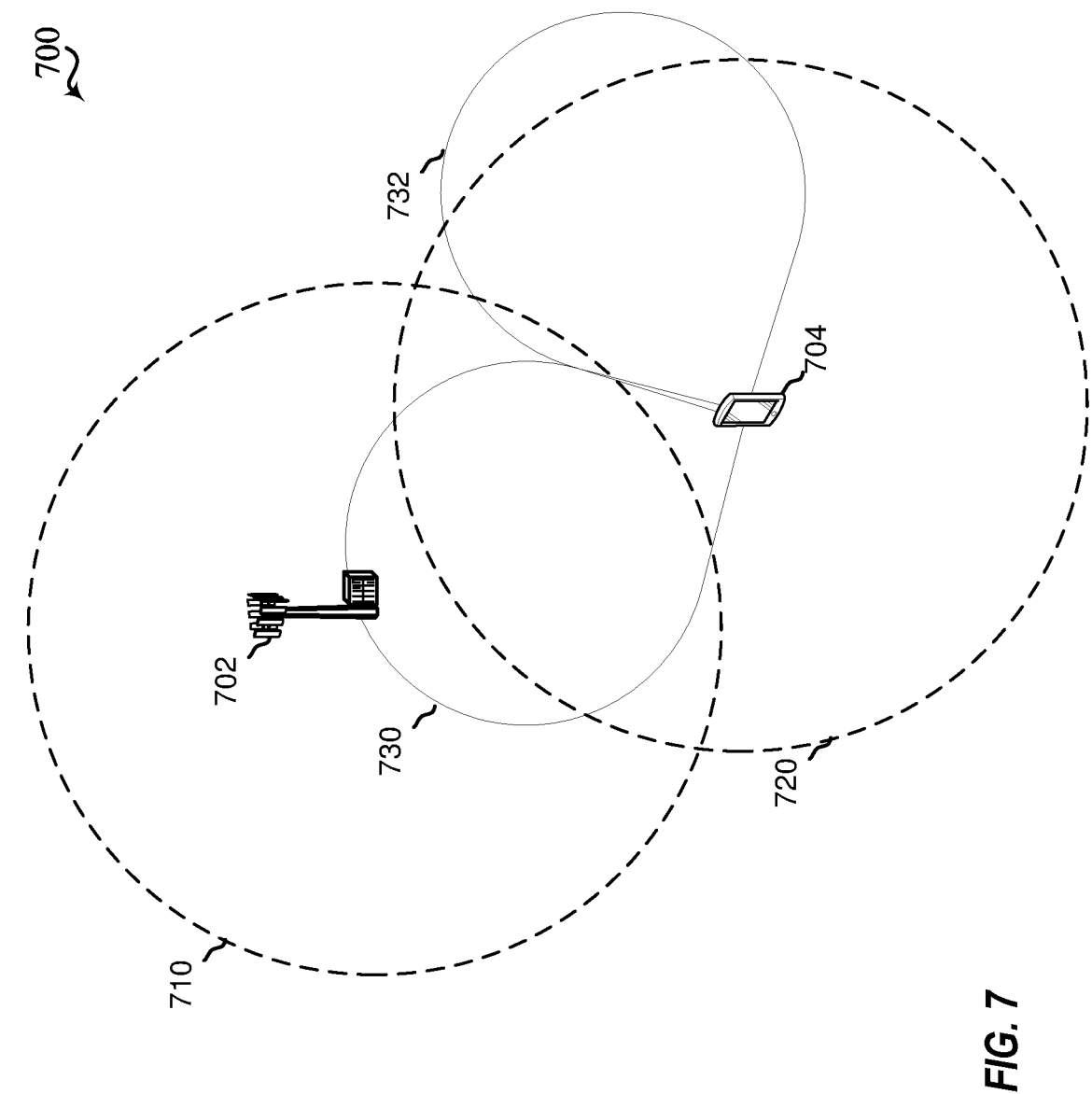
FIG. 7 illustrates an example of a system for supporting enhanced COT sharing in wireless communications in accordance with aspects of the present disclosure.

FIG. 7, illustrates a diagram of a system 700 for supporting enhanced COT sharing in wireless communications. In some examples, the system 700 may be deployed as an NR system operating in a shared spectrum, which may include shared frequency bands, such as, for example, unlicensed frequency bands. The NR system operating in the unlicensed spectrum may be referred to as an NR-U system. For example, the system 700 may include a base station 702 (e.g., base station 105 in FIG. 1) and UE 704 (e.g., UE 115 in FIG. 1) communicating in the shared spectrum. It is noted that the system 700 may be deployed with many more base stations and UEs communicating in multiple coverage areas, and that one base station and one UE are described in FIG. 7 for the sake of simplicity and ease of discussion.

In a scenario, the UE 704 may be located at an edge of a cell of the base station 702. In the NR system, it has been observed that the UE 704 may be out of the area covered by the base station's 702 LBT range 710. It is noted although the UE 704 is shown out of the LBT range 710, the UE 704 may still be located within the service coverage area (e.g., cell edge) of the base station 702. Likewise, the base station 702 may be out of the area covered by the UE's 704 LBT range 720. Accordingly, the COT sharing protocols described above in FIGS. 4, 5, and 6 may be implemented in the system 700 to enable COT sharing. In some aspects, the COT sharing protocols may be applied to a particular beam direction. The UE 704 may employ beamforming in which the UE 704 may perform directional transmission to shape or steer an antenna beam. Here, the UE 704 may be able to transmit on a first beam 730 in a direction towards the base station 702 and a second beam 730 in a direction offset from the base station 702. The COT sharing protocols described in FIGS. 4, 5, and 6 may be applied when the UE 704 wants to transmit on the second beam 732, and may not be applied when the UE 704 wants to transmit on the first beam 730. In this regard, the UE 704 may use the COT sharing protocol described in FIG. 2 for transmitting on the first beam 730.

In other aspects, the COT sharing protocols described in FIGS. 4, 5, and 6 may be applied to a particular transmission mode. For example, the COT sharing protocols described in FIGS. 4, 5, and 6 may be applied to a transmission that does not involve frequency hopping (e.g., frequency hopping mode). In another example, the COT sharing protocols described in FIGS. 4, 5, and 6 may be applied to a transmission that utilizes a transmission power above a predetermined threshold (e.g., transmit power mode). In still other examples, the COT sharing protocols described in FIGS. 4, 5, and 6 may be applied to a transmission associated with a type of data (e.g., data type mode). For example, the COT sharing protocols may be applied to relatively long transmissions as compared to short transmissions such as short format PUCCH or short format PDCCH.

Figure 8:
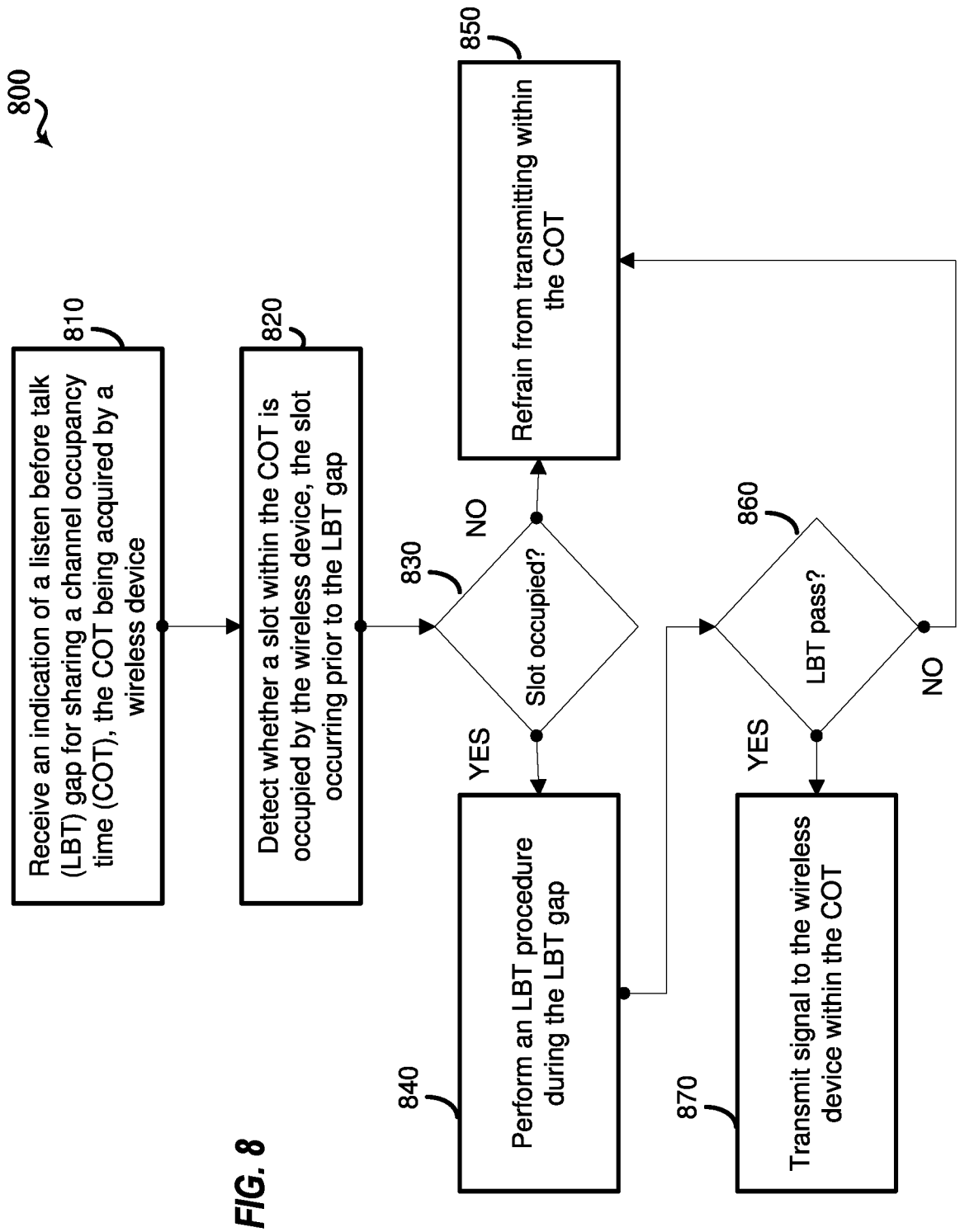
FIGS. 8-9 illustrate block flow diagrams of methods for supporting enhanced COT sharing in wireless communications in accordance with aspects of the present disclosure.
Figure 9:
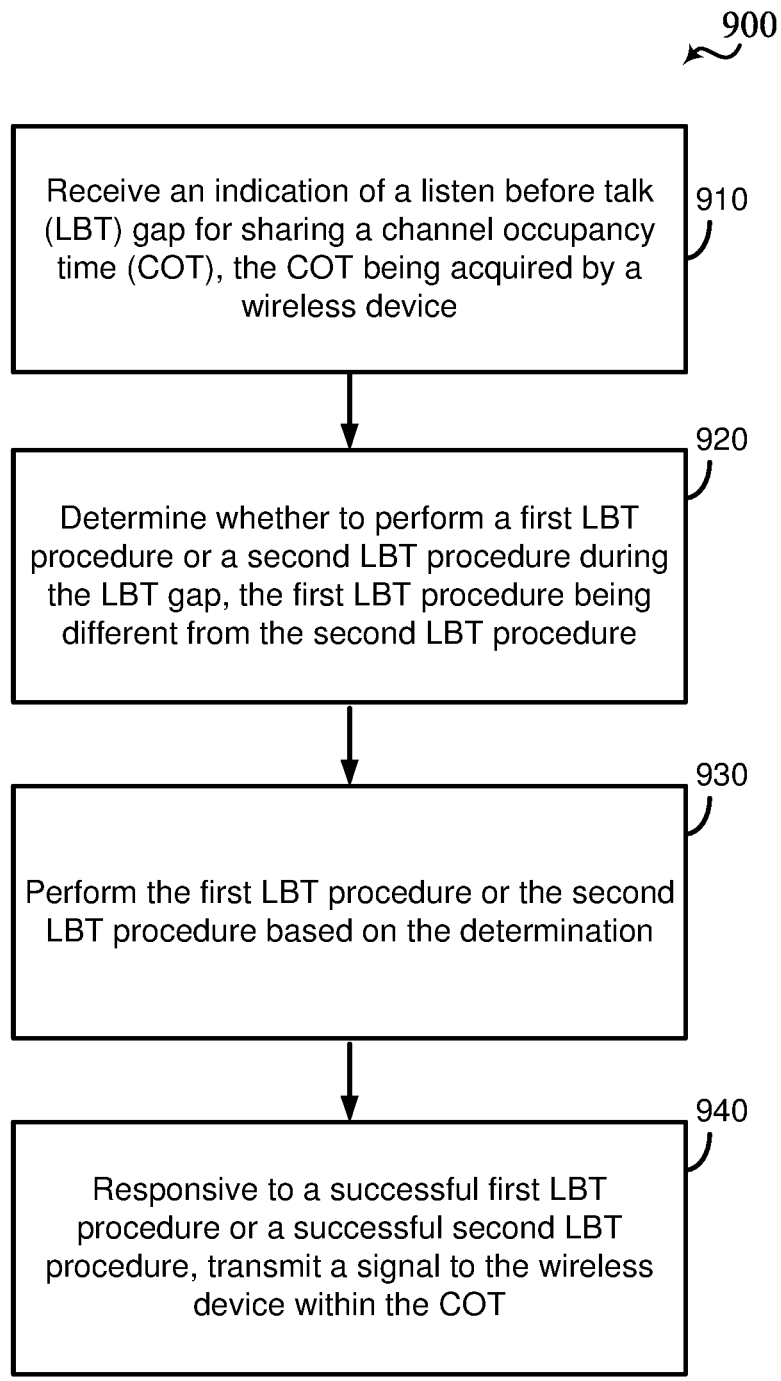

FIGS. 8-9 illustrate block flow diagrams of methods for supporting enhanced COT sharing in accordance with the present disclosure. The methods of FIGS. 8-9 may be described with reference to the COT sharing protocols of FIGS. 4-7 and may use the same reference numerals for ease of discussion.

In FIG. 8 a method 800 for supporting enhanced COT sharing in wireless communications is provided. The operations of the method 800 may be implemented by a UE 115, 404, 406, 408, 504, 506, 604, 606, 704 or its components as described herein with reference to FIGS. 12-13. In some examples, a UE 115, 404, 406, 408, 504, 506, 604, 606, 704 may execute a set of codes to control the functional elements of the device to perform the functions described below. Additionally, the UE 115, 404, 406, 408, 504, 506, 604, 606, 704 may perform aspects of the functions described below using special-purpose hardware. Alternatively, the operations of the method 800 may be implemented by a base station 105, 402, 502, 602, 702 or its components as described herein with reference to FIGS. 10-11. In some examples, a base station 105, 402, 502, 602, 702 may execute a set of codes to control the functional elements of the device to perform the functions described below. Additionally, the base station 105, 402, 502, 602, 702 may perform aspects of the functions described below using special-purpose hardware.

At block 810, a wireless device (e.g., UE or base station) may receive an indication of a listen before talk (LBT) gap for sharing a channel occupancy time (COT). The COT may be acquired by another wireless device (e.g., UE or base station). The operations of block 810 may be performed according to the methods described herein. In some examples, the wireless device may include a base station and may share the COT with its UEs for base station-to-UE COT sharing for a scheduled uplink transmission. In some other examples, the wireless device may include a UE and may share the COT with for UE-to-base station COT sharing for a feedback transmission (e.g., HARQ feedback).

In an aspect, the wireless device may receive the indication of the LBT gap via a DCI message (e.g., uplink grant via PDCCH). In another aspect, the wireless device may receive the indication of the LBT gap via UCI message (e.g., control information via PUCCH).

At block 820, the wireless device (e.g., UE or base station) may detect whether a slot within the COT is occupied by the other wireless device. The operations of block 820 may be performed according to the methods described herein. In some examples, the wireless device may detect whether the slot (e.g., channel occupancy slot 416, 516, 616) is occupied by energy detection. In some other examples, the wireless device may detect whether the slot (e.g., channel occupancy slot 416, 516, 616) is occupied by signal detection.

In other examples, the wireless device may use an ED threshold for the slot that is the same as an ED threshold used for the LBT procedure (block 840). In some other examples, the wireless device may use an ED threshold for the slot that is the same as an ED threshold used for the LBT procedure (block 840).

In some examples, the slot may be statically configured via higher layer (e.g., RRC message). In some other examples, the slot may be dynamically configured to be floating with respect to the LBT gap (e.g., via DCI message or UCI message).

At block 830, the method 800 proceeds to block 840 if the wireless device (e.g., UE or base station) detects that the slot is occupied by the other wireless device or the method 800 proceeds to block 850 if the wireless device (e.g., UE or base station) detects that the slot is not occupied by the other wireless device.

At bock 850, the wireless device (e.g., UE or base station) may refrain from transmitting within the COT. The operations of block 850 may be performed according to the methods described herein. In some examples, the wireless device may not perform the transmission since it did not detect that the slot (e.g., channel occupancy slot 416, 516, 616) was occupied. In some other examples, the wireless device may not perform the transmission since it did not pass the LBT procedure (block 860).

At block 840, the wireless device (e.g., UE or base station) may perform an LBT procedure during the LBT gap. The operations of block 840 may be performed according to the methods described herein. In some examples, the wireless device may perform a CAT1, CAT2, or CAT4 LBT (e.g., LBT procedure 420, 430, 440, 520, 530, 620, 630) during the LBT gap (e.g., gap 414, 514, 614). In other examples, the wireless device may use an ED threshold for the LBT gap that is the same as an ED threshold used for the slot (block 820). In some other examples, the wireless device may use an ED threshold for the LBT gap that is the same as an ED threshold used for the slot (block 820).

At block 860, the method 800 proceeds to block 850 if the LBT procedure is unsuccessful (e.g., not pass) or the method 800 proceeds to block 870 if the LBT procedure is successful (e.g., pass).

At block 870, the wireless device (e.g., UE or base station) may transmit a signal to the other wireless device within the COT. The operations of block 870 may be performed according to the methods described herein. In some examples, the wireless device may include a base station and may perform a DL transmission (e.g., HARQ feedback). In some other examples, the wireless device may include a UE and may perform an UL transmission (e.g., scheduled UL).

In some other examples, the wireless device may transmit the signal based on a type of data to be transmitted. In other examples, the wireless device may transmit the signal based on a power used for the transmission. In still other examples, the wireless device may transmit the signal based on a frequency hopping mode. In some examples, the wireless device may transmit the signal based on a beam used for the transmission.

In FIG. 9, a method 900 for supporting enhanced COT sharing in wireless communications is provided. The operations of the method 900 may be implemented by a UE 115, 404, 406, 408, 504, 506, 604, 606, 704 or its components as described herein with reference to FIGS. 12-13. In some examples, a UE 115, 404, 406, 408, 504, 506, 604, 606, 704 may execute a set of codes to control the functional elements of the device to perform the functions described below. Additionally, the UE 115, 404, 406, 408, 504, 506, 604, 606, 704 may perform aspects of the functions described below using special-purpose hardware. Alternatively, the operations of the method 800 may be implemented by a base station 105, 402, 502, 602, 702 or its components as described herein with reference to FIGS. 10-11. In some examples, a base station 105, 402, 502, 602, 702 may execute a set of codes to control the functional elements of the device to perform the functions described below. Additionally, the base station 105, 402, 502, 602, 702 may perform aspects of the functions described below using special-purpose hardware.

At block 910, a wireless device (e.g., UE or base station) may receive an indication of a listen before talk (LBT) gap for sharing a channel occupancy time (COT). The COT may be acquired by another wireless device (e.g., UE or base station). The operations of block 910 may be performed according to the methods described herein. In some examples, the wireless device may include a base station and may share the COT with its UEs for base station-to-UE COT sharing for a scheduled uplink transmission. In some other examples, the wireless device may include a UE and may share the COT with for UE-to-base station COT sharing for a feedback transmission (e.g., HARQ feedback).

In an aspect, the wireless device may receive the indication of the LBT gap via a DCI message (e.g., uplink grant via PDCCH). In another aspect, the wireless device may receive the indication of the LBT gap via UCI message (e.g., control information via PUCCH).

At block 920, the wireless device (e.g., UE or base station) may determine whether to perform a first LBT procedure or a second LBT procedure during the LBT gap. The first LBT procedure may be different from the second LBT procedure. The operations of block 920 may be performed according to the methods described herein.

In some examples, the first LBT procedure (e.g., LBT procedure 420, 430, 440, 520, 530, 620, 630) may comprise a CAT 2 LBT procedure, and the second LBT procedure (e.g., LBT procedure 420, 430, 440, 520, 530, 620, 630) may comprise a CAT4 LBT procedure. In some other examples, the first LBT procedure may use a different ED threshold than the second LBT procedure.

In other examples, the wireless device may receive a request from the other wireless device to measure a RSRP to determine whether to use the first LBT procedure or the second LBT procedure. In still other examples, the wireless device may make the determination based on a distance between itself and the other wireless device.

In some examples, the wireless device (e.g., UE) may receive, via a DCI message, an indication of a type of measurement to perform to determine the distance between itself and the other wireless device. In some other examples, the wireless device (e.g., base station) may receive, via a UCI message, an indication of a type of measurement to perform to determine the distance between itself and the other wireless device.

At block 930, the wireless device (e.g., UE or base station) may perform the first LBT procedure or the second LBT procedure based on the determination (block 920). The operations of block 930 may be performed according to the methods described herein. In some examples, At block 940, the wireless device (e.g., UE or base station), responsive to a successful first LBT procedure or a successful second LBT procedure, may transmit a signal to the other wireless device within the COT. The operations of block 940 may be performed according to the methods described herein. In some other examples, the wireless device may transmit the signal based on a type of data to be transmitted. In other examples, the wireless device may transmit the signal based on a power used for the transmission. In still other examples, the wireless device may transmit the signal based on a frequency hopping mode. In some examples, the wireless device may transmit the signal based on a beam used for the transmission.

It is noted that one or more blocks described in the method 800 may be combined with the method 900 and vice versa. For example, the block 920 of method 900 may be included in the block 840 of method 800 when the wireless device (e.g., UE or base station) may perform an LBT procedure during the LBT gap. As another example, the wireless may be configured to operate in a first mode according the method 800 and a second mode according to the method 900 in various scenarios.

Figure 10:
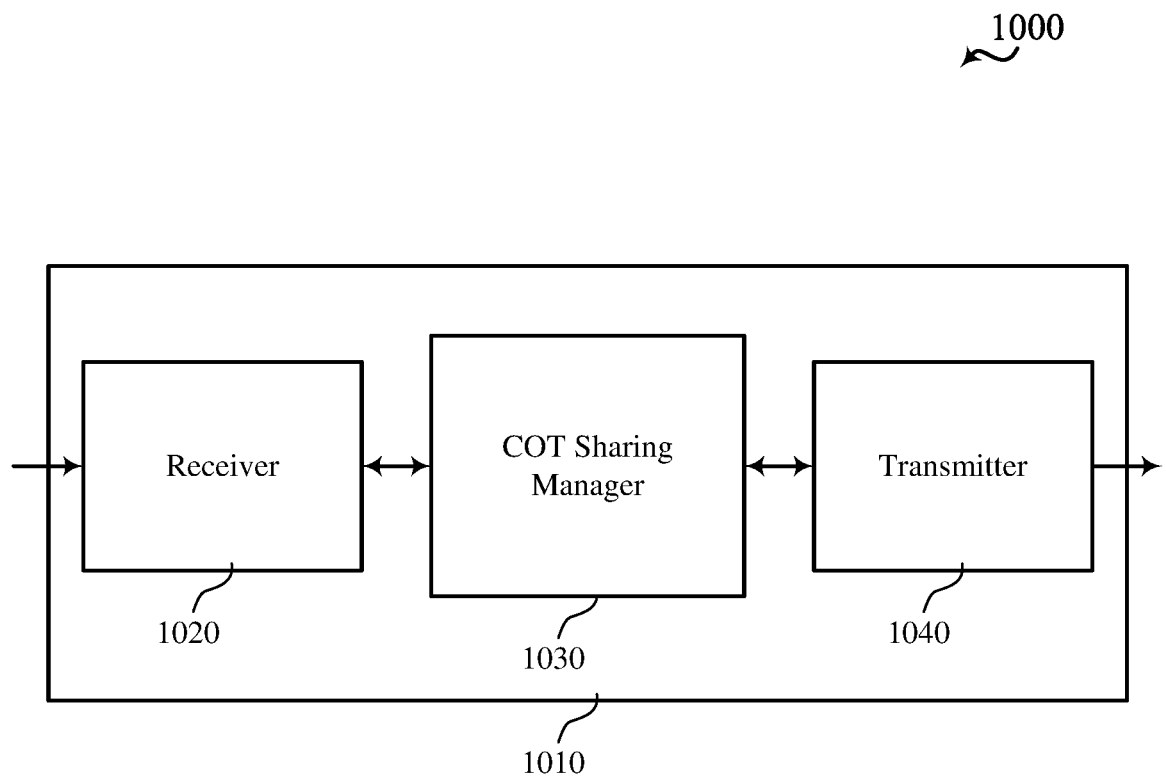
FIG. 10 illustrates a block diagram of a device that supports enhanced COT sharing in wireless communications in accordance with aspects of the present disclosure.

FIG. 10 shows a block diagram 1000 of a wireless device 1010 that supports enhanced COT sharing in wireless communications in accordance with aspects of the present disclosure. Wireless device 1010 may be an example of aspects of a base station 105, 402, 502, 602, 702 as described herein. Wireless device 1010 may include a receiver 1020, COT sharing manager 1030, and transmitter 1040. Wireless device 1010 may also include a processor. Each of these components may be in communication with one another (e.g., via one or more buses).

Receiver 1020 may receive information such as packets, user data, or control information associated with various uplink channels such as physical uplink control channel (PUCCH), physical uplink shared channel (PUSCH), physical random access channel (PRACH), demodulation reference signal (DM-RS), sounding reference signal (SRS), scheduling request (SR), and the like. Information may be passed on to other components of the device. The receiver 1020 may be an example of aspects of the transceiver 1135 described with reference to FIG. 11. The receiver 1020 may utilize a single antenna or a set of antennas.

The COT sharing manager 1030 may be an example of aspects of COT sharing manager 1115 described with reference to FIG. 11.

The COT sharing manager 1030 and/or at least some of its various sub-components may be implemented in hardware, software executed by a processor, firmware, or any combination thereof. If implemented in software executed by a processor, the functions of the COT sharing manager 1030 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The COT sharing manager 1030 and/or at least some of its various sub-components may be physically located at various positions, including being distributed such that portions of functions are implemented at different physical locations by one or more physical devices. In some examples, the COT sharing manager 1030 and/or at least some of its various sub-components may be a separate and distinct component in accordance with various aspects of the present disclosure. In other examples, the COT sharing manager 1030 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The COT sharing manager 1030 may manage a configuration of one or more UEs 115, 404, 406, 408, 504, 506, 604, 606, 704 with respect to COT sharing as was described in FIGS. 4-9. In some examples, the COT sharing manager 1030 may be configured to receive an indication of a LBT gap for sharing a COT. The COT being acquired by another wireless device (e.g., UE 115, 404, 406, 408, 504, 506, 604, 606, 704). The COT sharing manager 1030 may be configured to detect whether a slot within the COT is occupied by the other wireless device wireless device. The slot may occur prior to the LBT gap. The COT sharing manager 1030 may also be configured, responsive to detecting that the slot is occupied, to perform an LBT procedure during the LBT gap, and responsive to a successful LBT procedure, to transmit signal to the other wireless device within the COT.

In another aspect, the COT sharing manager 1030 may be configured to receive an indication of a LBT gap for sharing a COT. The COT being acquired by another wireless device (e.g., UE 115, 404, 406, 408, 504, 506, 604, 606, 704). The COT sharing manager 1030 may be configured to determine whether to perform a first LBT procedure or a second LBT procedure different from the first LBT procedure during the LBT gap, and to perform the first LBT procedure or the second LBT procedure based the determination. The COT sharing manager 1030 may also be configured to, responsive to a successful first LBT procedure or a successful second LBT procedure, transmit a signal to the other wireless device within the COT.

Transmitter 1040 may transmit signals generated by other components of the device. In some examples, the transmitter 1040 may be collocated with a receiver 1020 in a transceiver module. For example, the transmitter 1040 may be an example of aspects of the transceiver 1135 described with reference to FIG. 11. The transmitter 1040 may utilize a single antenna or a set of antennas.

Transmitter 1040 may transmit information such as packets, user data, or control information associated downlink signals/channels such as such as discovery reference signal (DRS), synchronization signal block (SSB), DM-RS, physical broadcast channel (PBCH), physical downlink control channel (PDCCH), physical downlink shared channel (PDSCH), and the like. In some examples, the transmitter 1040 may transmit the configuration for supporting enhanced COT sharing as described herein.

Figure 11:
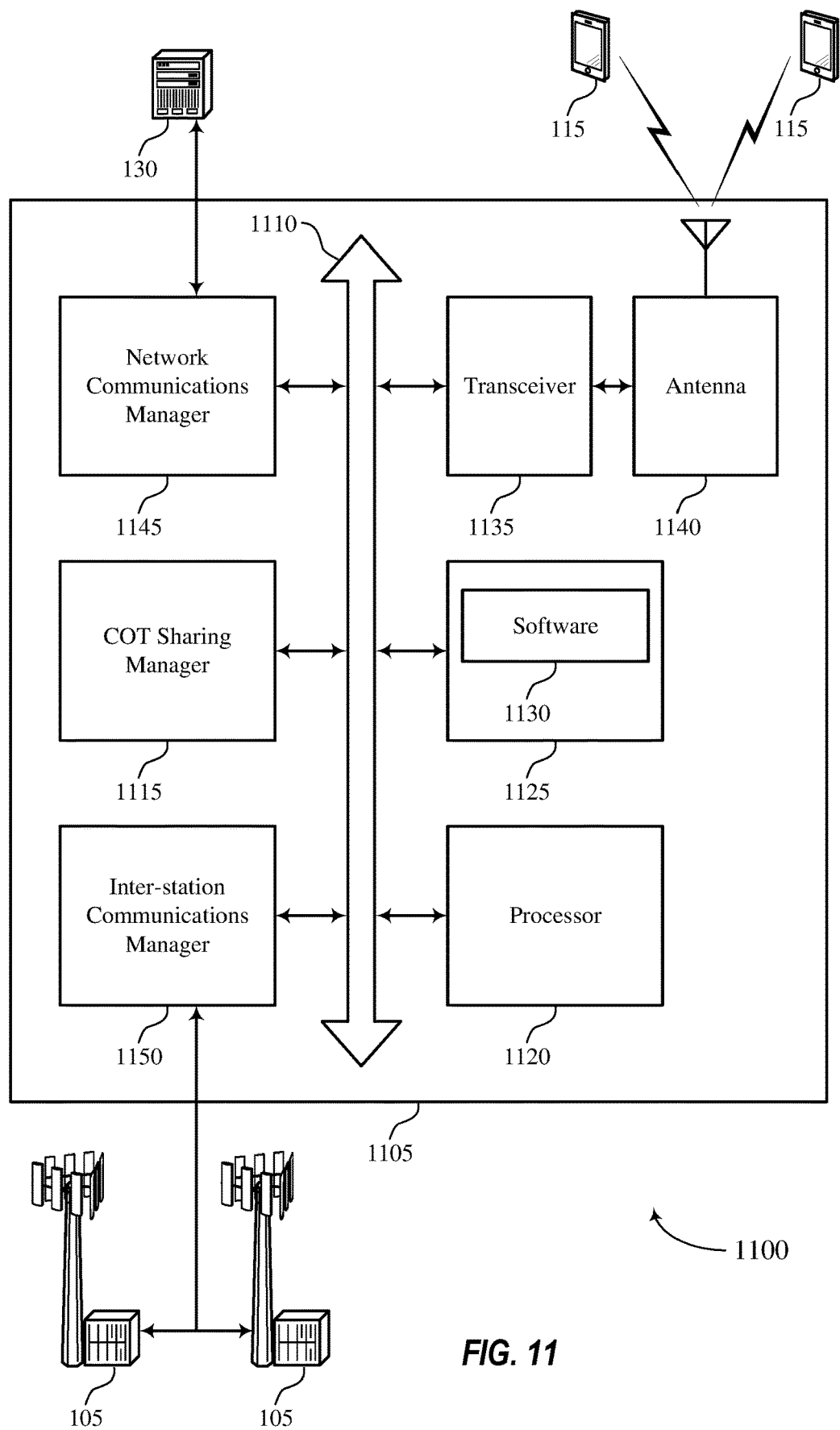
FIG. 11 illustrates a block diagram of a system including a base station that supports enhanced COT sharing in wireless communications in accordance with aspects of the present disclosure.

FIG. 11 shows a diagram of a system 1100 including a device 1105 that supports enhanced COT sharing in wireless communications in accordance with aspects of the present disclosure. Device 1105 may be an example of or include the components of wireless device 1010 or a base station 105, 402, 502, 602, 702 as described herein. Device 1105 may include components for bi-directional voice and data communications including components for transmitting and receiving communications, including slot format manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more user equipment (UE)s 115, 404, 406, 408, 504, 506, 604, 606, 704.

The COT sharing manager 1115 may manage enabling/disabling COT sharing as described in various aspects and examples herein. For examples, the COT sharing manager may maintain configuration parameters and manage various procedures to support enhanced COT sharing in wireless communications as described herein in FIGS. 4-9.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting enhanced COT sharing a wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support long term channel sensing in a shared spectrum. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115, 404, 406, 408, 504, 506, 604, 606, 704.

Inter-station communications manager 1150 may manage communications with other base station 105, 402, 502, 602, 702, and may include a controller or scheduler for controlling communications with UEs 115 in cooperation with other base stations 105, 402, 502, 602, 702. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an NR wireless communication network technology to provide communication between base stations 105, 402, 502, 602, 702.

Figure 12:
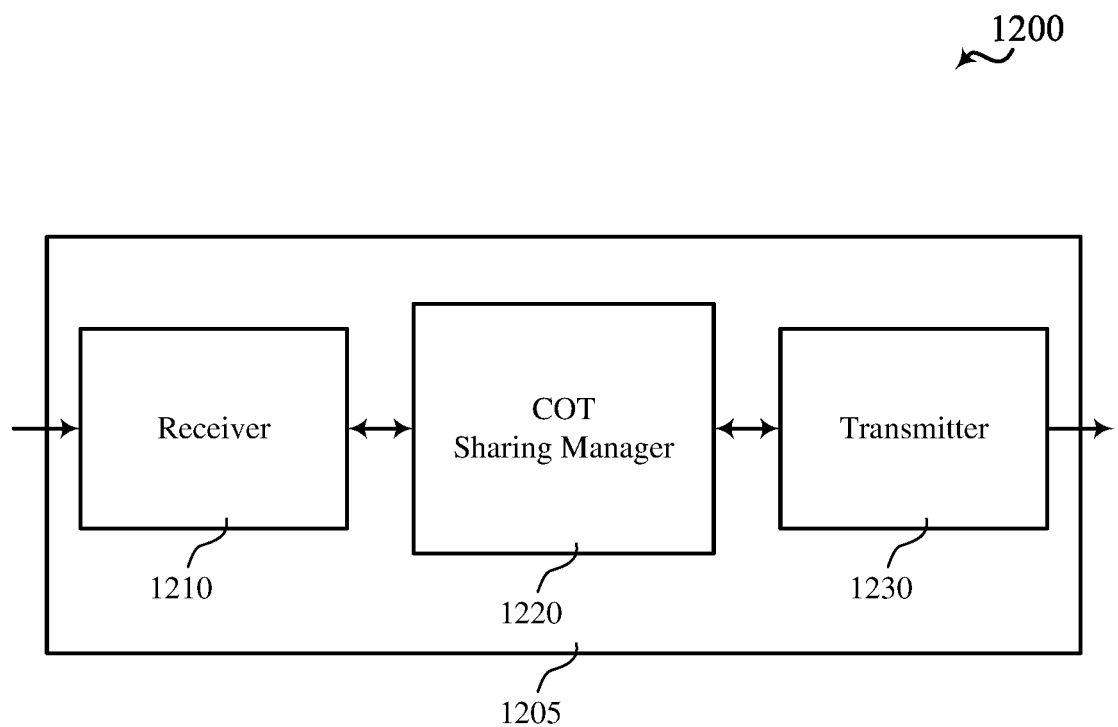
FIG. 12 illustrates a block diagram of a device that supports enhanced COT sharing in wireless communications in accordance with aspects of the present disclosure.

FIG. 12 shows a block diagram 1200 of a wireless device 1205 that supports enhanced COT sharing in wireless communications in accordance with aspects of the present disclosure. Wireless device 1205 may be an example of aspects of a UE 115, 404, 406, 408, 504, 506, 604, 606, 704 as described herein. Wireless device 1205 may include receiver 1210, UE COT sharing manager 1220, and transmitter 1230. Wireless device 1205 may also include a processor. Each of these components may be in communication with one another (e.g., via one or more buses).

Receiver 1210 may receive information such as packets, user data, or control information associated downlink signals/channels such as such as DRS, SSB, DM-RS, PBCH, PDCCH, PDSCH, and the like. Information may be passed on to other components of the device. The receiver 1210 may be an example of aspects of the transceiver 1335 described with reference to FIG. 13. The receiver 1210 may utilize a single antenna or a set of antennas.

The UE COT sharing manager 1220 may be an example of aspects of the UE COT sharing manager 1315 described with reference to FIG. 13.

The UE COT sharing manager 1220 and/or at least some of its various sub-components may be implemented in hardware, software executed by a processor, firmware, or any combination thereof. If implemented in software executed by a processor, the functions of the UE COT sharing manager 1220 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE COT sharing manager 1220 and/or at least some of its various sub-components may be physically located at various positions, including being distributed such that portions of functions are implemented at different physical locations by one or more physical devices. In some examples, UE COT sharing manager 1220 and/or at least some of its various sub-components may be a separate and distinct component in accordance with various aspects of the present disclosure. In other examples, the UE COT sharing manager 1220 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE COT sharing manager 1220 may manage and implement configuration parameters to support enhanced COT sharing as described in FIGS. 4-9. In some examples, the UE COT sharing manager 1220 may be configured to receive an indication of an LBT gap for sharing a COT. The COT being acquired by another wireless device (e.g., base station 105, 402, 502, 602, 702). The COT sharing manager 1220 may be configured to detect whether a slot within the COT is occupied by the other wireless device wireless device. The slot may occur prior to the LBT gap. The COT sharing manager 1220 may also be configured, responsive to detecting that the slot is occupied, to perform an LBT procedure during the LBT gap, and responsive to a successful LBT procedure, to transmit signal to the other wireless device within the COT.

In another aspect, the COT sharing manager 1220 may be configured to receive an indication of an LBT gap for sharing COT. The COT being acquired by another wireless device (e.g., base station 105, 402, 502, 602, 702). The COT sharing manager 1220 may be configured to determine whether to perform a first LBT procedure or a second LBT procedure different from the first LBT procedure during the LBT gap, and to perform the first LBT procedure or the second LBT procedure based the determination. The COT sharing manager 1220 may also be configured, responsive to a successful first LBT procedure or a successful second LBT procedure, transmit a signal to the other wireless device within the COT.

Transmitter 1230 may transmit signals generated by other components of the device. The transmitter 1230 may transmit information such as packets, user data, or control information associated with various uplink channels such as PUCCH, PUSCH, PRACH, DM-RS, SRS, SR, and the like. In some examples, the transmitter 1230 may be collocated with a receiver 1210 in a transceiver module. For example, the transmitter 1230 may be an example of aspects of the transceiver 1335 described with reference to FIG. 13. The transmitter 1230 may utilize a single antenna or a set of antennas.

Figure 13:
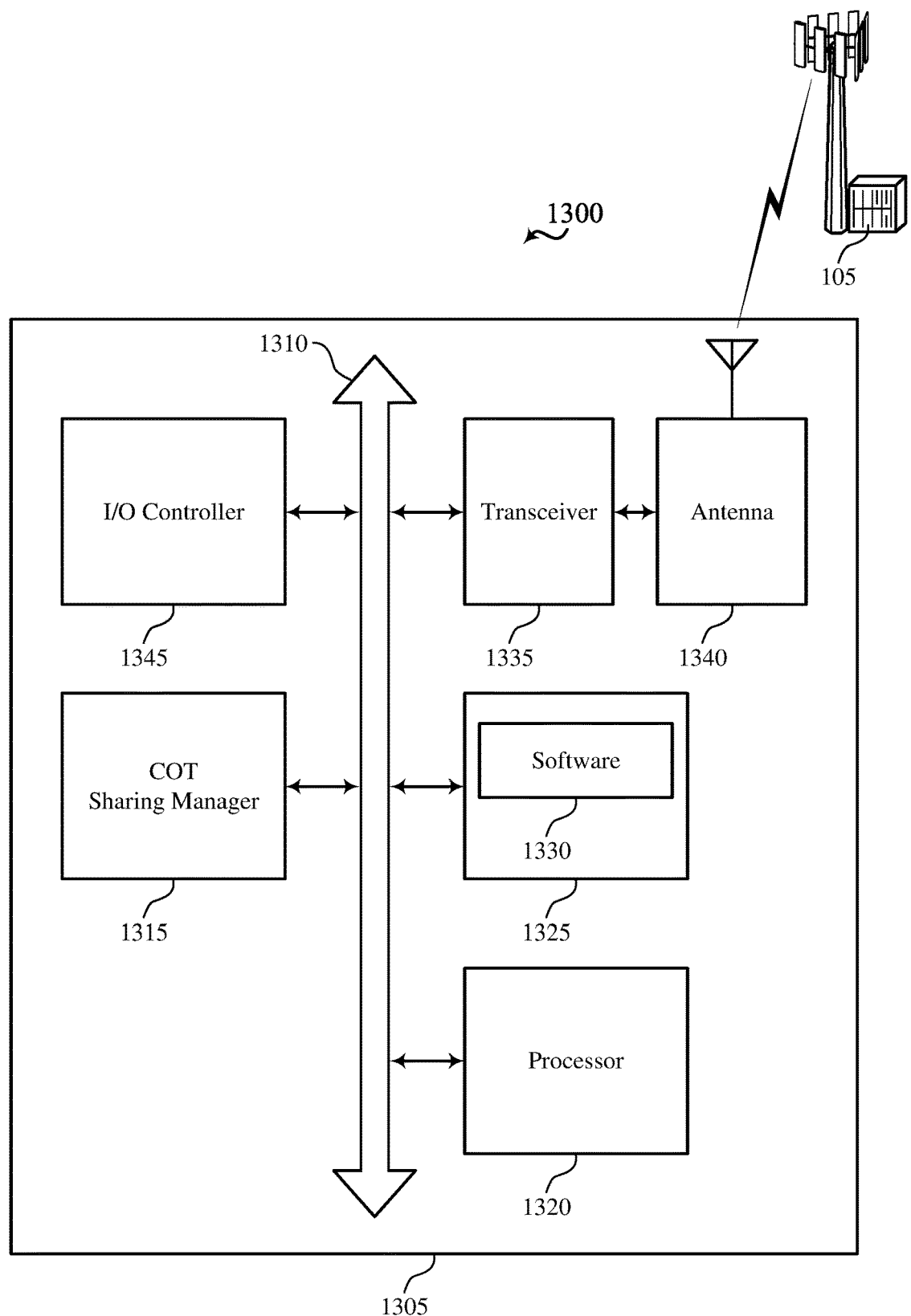
FIG. 13 illustrates a block diagram of a system including a UE that supports enhanced COT sharing in wireless communications in accordance with aspects of the present disclosure.

FIG. 13 shows a diagram of a system 1300 including a device 1305 that supports enhanced COT sharing in wireless communications in accordance with aspects of the present disclosure. Device 1305 may be an example of or include the components of UE 115, 404, 406, 408, 504, 506, 604, 606, 704 as described above herein. Device 1305 may include components for bi-directional voice and data communications including components for transmitting and receiving communications, including UE COT sharing manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105, 402, 502, 602, 702.

The UE COT sharing manager 1315 may maintain configuration parameters and manage various procedures to support enhanced COT sharing in wireless communications as described herein in FIGS. 4-9.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting operation with multiple BW parts in a shared spectrum).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support multiple BW parts a shared spectrum. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

It should be noted that the methods described above describe possible implementations, and that the operations and the steps may be rearranged or otherwise modified and that other implementations are possible. Furthermore, aspects from two or more of the methods may be combined.

Further aspects of the present disclosure include the following:

Clause 1. A non-transitory computer-readable medium storing code for wireless communications, the code comprising instructions executable to:

receive, by a first wireless device, an indication of a listen before talk (LBT) gap for sharing a channel occupancy time (COT), the COT being acquired by a second wireless device;

detect whether a slot within the COT is occupied by the second wireless device, the slot occurring prior to the LBT gap;

responsive to detecting that the slot is occupied by the second wireless device, perform an LBT procedure during the LBT gap; and responsive to a successful LBT procedure, transmitting a signal to the second wireless device within the COT.

Clause 2. The non-transitory computer-readable medium of clause 1, wherein the slot is statically configured via higher layer.

Clause 3. The non-transitory computer-readable medium of clause 1, wherein the slot is dynamically configured to be floating with respect to the LBT gap.

Clause 4. The non-transitory computer-readable medium of clauses 1-3, wherein a threshold for detecting occupancy in the slot is different from a threshold associated with the LBT procedure.

Clause 5. The non-transitory computer-readable medium of clauses 1-3, wherein a threshold for detecting occupancy in the slot is the same as a threshold associated with the LBT procedure.

Clause 6. The non-transitory computer-readable medium of clauses 1-5, wherein the code further comprises instructions executable to, responsive to detecting that the slot is not occupied by the second wireless device, refrain from transmitting within the COT.

Clause 7. The non-transitory computer-readable medium of clauses 1-6, wherein the code further comprises instructions executable to, responsive to an unsuccessful LBT procedure, refrain from transmitting within the COT.

Clause 8. The non-transitory computer-readable medium of clauses 1-7, wherein the instructions executable to transmit is based on at least one of a type of data to be transmitted, a power used for the transmission, a frequency hopping mode, or a beam used for the transmission.

Clause 9. The non-transitory computer-readable medium of clauses 1-8, wherein the instructions executable to receive the indication is via at least one of a downlink control information (DCI) or an uplink control information (UCI).

Clause 10. A non-transitory computer-readable medium storing code for wireless communications, the code comprising instructions executable to:

receive, by a first wireless device, an indication of a listen before talk (LBT) gap for sharing a channel occupancy time (COT), the COT being acquired by a second wireless device;

determine, by the first wireless device, whether to perform a first LBT procedure or a second LBT procedure during the LBT gap, the first LBT procedure being different from the second LBT procedure;

perform, by the first wireless device, the first LBT procedure or the second LBT procedure based the determination; and responsive to a successful first LBT procedure or a successful second LBT procedure, transmit, by the first wireless device, a signal to the second wireless device within the COT.

Clause 11. The non-transitory computer-readable medium of clause 10, wherein the first LBT procedure comprises a category 2 (CAT2) LBT procedure and the second LBT procedure comprises a category 4 (CAT4) LBT procedure.

Clause 12. The non-transitory computer-readable medium of clauses 10-11, wherein the instructions executable to determine comprises instructions executable to receive a request from the second wireless device to measure a reference signal received power (RSRP) to determine whether to use the first LBT procedure or the second LBT procedure.

Clause 13. The non-transitory computer-readable medium of clauses 10-12, wherein the instructions executable to determine is based on a distance between the first and second wireless devices.

Clause 14. The non-transitory computer-readable medium of clauses 10-13, wherein the first LBT procedure is associated with a different threshold than the second LBT procedure.

Clause 15. The non-transitory computer-readable medium of clauses 13, wherein the code further comprises instructions executable to measure a reference signal received power (RSRP) to determine the distance between the first and second wireless devices.

Clause 16. The non-transitory computer-readable medium of clauses 13, wherein the code further comprises instructions executable to receive, via at least one of a downlink control information (DCI) message or an uplink control information (UCI) message, an indication of a type of measurement to perform to determine the distance between the first and second wireless devices.

Clause 17. The non-transitory computer-readable medium of clauses 10-16, wherein the instructions executable to transmit is based on at least one of a type of data to be transmitted, a power used for the transmission, a frequency hopping mode, or a beam used for the transmission.

Clause 18. An apparatus for wireless communications, comprising:

means for receiving, by a first wireless device, an indication of a listen before talk (LBT) gap for sharing a channel occupancy time (COT), the COT being acquired by a second wireless device;

means for detecting whether a slot within the COT is occupied by the second wireless device, the slot occurring prior to the LBT gap;

responsive to detecting that the slot is occupied by the second wireless device, means for performing an LBT procedure during the LBT gap; and responsive to a successful LBT procedure, means for transmitting a signal to the second wireless device within the COT.

Clause 19. The apparatus of clause 18, wherein the slot is statically configured via higher layer.

Clause 20. The apparatus of clause 18, wherein the slot is dynamically configured to be floating with respect to the LBT gap.

Clause 21. The apparatus of clauses 18-20, wherein a threshold for detecting occupancy in the slot is different from a threshold associated with the LBT procedure.

Clause 22. The apparatus of clauses 18-20, wherein a threshold for detecting occupancy in the slot is the same as a threshold associated with the LBT procedure.

Clause 23. The apparatus of clauses 18-22, further comprising, responsive to detecting that the slot is not occupied by the second wireless device, means for refraining from transmitting within the COT.

Clause 24. The apparatus of clauses 18-23, further comprising, responsive to an unsuccessful LBT procedure, means for refraining from transmitting within the COT.

Clause 25. The apparatus of clauses 18-24, wherein the means for transmitting is based on at least one of a type of data to be transmitted, a power used for the transmission, a frequency hopping mode, or a beam used for the transmission.

Clause 26. The apparatus of clauses 18-25, wherein the means for receiving the indication comprises means for receiving the indication via at least one of a downlink control information (DCI) or an uplink control information (UCI).

Clause 27. An apparatus for wireless communications, comprising:

means for receiving, by a first wireless device, an indication of a listen before talk (LBT) gap for sharing a channel occupancy time (COT), the COT being acquired by a second wireless device;

means for determining, by the first wireless device, whether to perform a first LBT procedure or a second LBT procedure during the LBT gap, the first LBT procedure being different from the second LBT procedure;

means for performing, by the first wireless device, the first LBT procedure or the second LBT procedure based the determination; and responsive to a successful first LBT procedure or a successful second LBT procedure, means for transmitting, by the first wireless device, a signal to the second wireless device within the COT.

Clause 28. The apparatus of clause 27, wherein the first LBT procedure comprises a category 2 (CAT2) LBT procedure and the second LBT procedure comprises a category 4 (CAT4) LBT procedure.

Clause 29. The apparatus of clauses 27-28, wherein the means for determining comprises means for receiving a request from the second wireless device to measure a reference signal received power (RSRP) to determine whether to use the first LBT procedure or the second LBT procedure.

Clause 30. The apparatus of clauses 27-29, wherein the means for determining comprises means for determining based on a distance between the first and second wireless device.

Clause 31. The apparatus of clauses 27-30, wherein the first LBT procedure is associated with a different threshold than the second LBT procedure.

Clause 32. The apparatus of clause 30, further comprising means for measuring a reference signal received power (RSRP) to determine the distance between the first and second wireless devices.

Clause 33. The apparatus of clause 30, further comprising means for receiving, via at least one of a downlink control information (DCI) message or an uplink control information (UCI) message, an indication of a type of measurement to perform to determine the distance between the first and second wireless devices.

Clause 34. The apparatus of clauses 27-33, wherein the means for transmitting comprises means for transmitting based on at least one of a type of data to be transmitted, a power used for the transmission, a frequency hopping mode, or a beam used for the transmission.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method of wireless communications, comprising:
  receiving, by a first wireless device, an indication of a listen before talk (LBT) gap for sharing a channel occupancy time (COT), the COT being acquired by a second wireless device;

detecting whether a slot within the COT is occupied by the second wireless device, the slot occurring prior to the LBT gap;

responsive to detecting that the slot is occupied by the second wireless device, performing an LBT procedure during the LBT gap, wherein an energy detection (ED) threshold for detecting occupancy in the slot is different from an ED threshold associated with the LBT procedure; and responsive to a successful LBT procedure, transmitting a signal to the second wireless device within the COT.

2. The method of claim 1, wherein the slot is statically configured via higher layer.

3. The method of claim 1, wherein the slot is dynamically configured to be floating with respect to the LBT gap.

4. The method of claim 1, further comprising, responsive to detecting that the slot is not occupied by the second wireless device, refraining from transmitting within the COT.

5. The method of claim 1, further comprising, responsive to an unsuccessful LBT procedure, refraining from transmitting within the COT.

6. The method of claim 1, wherein the transmitting is based on at least one of a type of data to be transmitted, a power used for the transmission, a frequency hopping mode, or a beam used for the transmission.

7. The method of claim 1, wherein the receiving the indication is via at least one of a downlink control information (DCI) or an uplink control information (UCI).

8. A method of wireless communications, comprising:

receiving, by a first wireless device, an indication of a listen before talk (LBT) gap for sharing a channel occupancy time (COT), the COT being acquired by a second wireless device;

determining, by the first wireless device, whether to perform a first LBT procedure or a second LBT procedure during the LBT gap, the first LBT procedure being different from the second LBT procedure, wherein the determining is based on a distance between the first and second wireless devices;

performing, by the first wireless device, the first LBT procedure or the second LBT procedure based on the determining; and responsive to a successful first LBT procedure or a successful second LBT procedure, transmitting, by the first wireless device, a signal to the second wireless device within the COT.

9. The method of claim 8, wherein the first LBT procedure comprises a category 2 (CAT2) LBT procedure and the second LBT procedure comprises a category 4 (CAT4) LBT procedure.

10. The method of claim 8, wherein the determining comprises receiving a request from the second wireless device to measure a reference signal received power (RSRP) to determine whether to use the first LBT procedure or the second LBT procedure.

11. The method of claim 8, wherein the first LBT procedure is associated with a different threshold than the second LBT procedure.

12. The method of claim 9, further comprising measuring a reference signal received power (RSRP) to determine the distance between the first and second wireless devices.

13. The method of claim 8, further comprising receiving, via at least one of a downlink control information (DCI) message or an uplink control information (UCI) message, an indication of a type of measurement to perform to determine the distance between the first and second wireless devices.

14. A wireless device for wireless communications, comprising:

a processor;

memory in electronic communication with the processor;

instructions stored in the memory, wherein the instructions are executable by the processor to:

receive an indication of a listen before talk (LBT) gap for sharing a channel occupancy time (COT), the COT being acquired by another wireless device;

detect whether a slot within the COT is occupied by the another wireless device, the slot occurring prior to the LBT gap;

responsive to detecting that the slot is occupied by the another wireless device, perform an LBT procedure during the LBT gap, wherein an energy detection (ED) threshold for detecting occupancy in the slot is different from an ED threshold associated with the LBT procedure; and responsive to a successful LBT procedure, transmit a signal to the another wireless device within the COT.

15. The wireless device of claim 14, wherein the slot is statically configured via higher layer.

16. The wireless device of claim 14, wherein the slot is dynamically configured to be floating with respect to the LBT gap.

17. The wireless device of claim 14, wherein the instructions are further executable by the processor to, responsive to detecting that the slot is not occupied by the another wireless device, refrain from transmitting within the COT.

18. The wireless device of claim 14, wherein the instructions are further executable by the processor to, responsive to an unsuccessful LBT procedure, refrain from transmitting within the COT.

19. The wireless device of claim 14, wherein the instructions executable by the processor to transmit is based on at least one of a type of data to be transmitted, a power used for the transmission, a frequency hopping mode, or a beam used for the transmission.

20. A wireless device for wireless communications, comprising:

a processor;

memory in electronic communication with the processor;

instructions stored in the memory, wherein the instructions are executable by the processor to:

receive an indication of a listen before talk (LBT) gap for sharing a channel occupancy time (COT), the COT being acquired by another wireless device;

determine whether to perform a first LBT procedure or a second LBT procedure during the LBT gap, the first LBT procedure being different from the second LBT procedure;

perform the first LBT procedure or the second LBT procedure based on the determination; and responsive to a successful first LBT procedure or a successful second LBT procedure, transmit a signal to the another wireless device within the COT, wherein the instructions executable by the processor to determine is based on a distance between the wireless device and the another wireless device.

21. The wireless device of claim 20, wherein the first LBT procedure comprises a category 2 (CAT2) LBT procedure and the second LBT procedure comprises a category 4 (CAT4) LBT procedure.

22. The wireless device of claim 20, wherein the instructions executable by the processor to determine comprises instructions executable by the processor to receive a request from the another wireless device to measure a reference signal received power (RSRP) to determine whether to use the first LBT procedure or the second LBT procedure.

23. The wireless device of claim 20, wherein the first LBT procedure is associated with a different threshold than the second LBT procedure.

24. The wireless device of claim 20, wherein the instructions are further executable by the processor to measure a reference signal received power (RSRP) to determine the distance between the wireless device and the another wireless device.

25. The wireless device of claim 20, wherein the instructions are further executable by the processor to receive, via at least one of a downlink control information (DCI) message or an uplink control information (UCI) message, an indication of a type of measurement to perform to determine the distance between the wireless device and the another wireless device.

26. The wireless device of claim 23, wherein the instructions executable by the processor to transmit is based on at least one of a type of data to be transmitted, a power used for the transmission, a frequency hopping mode, or a beam used for the transmission.

* * * * *